United States Patent
Peckover

(10) Patent No.: US 9,984,156 B2
(45) Date of Patent: *May 29, 2018

(54) SYSTEM, METHOD AND APPARATUS FOR ELECTRONICALLY SEARCHING FOR AN ITEM

(75) Inventor: Douglas Peckover, Dallas, TX (US)

(73) Assignee: YOUR COMMAND, LLC, Carrollton, TX (US)

(*) Notice: Subject to any disclaimer, the term of this patent is extended or adjusted under 35 U.S.C. 154(b) by 0 days. days.

This patent is subject to a terminal disclaimer.

(21) Appl. No.: 13/598,348

(22) Filed: Aug. 29, 2012

(65) Prior Publication Data

US 2012/0323886 A1 Dec. 20, 2012

Related U.S. Application Data

(63) Continuation of application No. 11/321,155, filed on Dec. 28, 2005, now Pat. No. 8,364,670.

(60) Provisional application No. 60/640,156, filed on Dec. 28, 2004.

(51) Int. Cl.
*G06F 7/00* (2006.01)
*G06F 17/30* (2006.01)

(52) U.S. Cl.
CPC .... *G06F 17/30864* (2013.01); *G06F 17/3064* (2013.01); *G06F 17/30672* (2013.01); *G06F 17/30867* (2013.01)

(58) Field of Classification Search
CPC .......... G09G 5/39; G09G 5/363; G09G 5/395; G06F 17/30312; G06F 17/30289; G06F 17/30315; G06F 3/0481
See application file for complete search history.

(56) References Cited

U.S. PATENT DOCUMENTS

| | | |
|---|---|---|
| 5,623,652 A | 4/1997 | Vora et al. |
| 5,778,361 A | 7/1998 | Nanjo et al. |
| 5,809,318 A | 9/1998 | Rivette et al. |
| 5,848,410 A | 12/1998 | Walls et al. |
| 5,907,838 A | 5/1999 | Miyasaka et al. |
| 5,978,779 A | 11/1999 | Stein et al. |
| 6,119,101 A | 9/2000 | Peckover |
| 6,201,048 B1 | 3/2001 | Raynolds et al. |

(Continued)

OTHER PUBLICATIONS

Hung, Lun-ping, "A personalized recommendation system based on product taxonomy for one-to-one marketing online," Expert Systems with Applications 29, pp. 383-392, Elsevier Ltd. 2005.

(Continued)

*Primary Examiner* — Hasanul Mobin
(74) *Attorney, Agent, or Firm* — Daniel J. Chalker; Edwin S. Flores; Chalker Flores, LLP

(57) ABSTRACT

The present invention provides a system, method and apparatus for electronically searching for an item by receiving a search request comprising a requested category and one or more requested attributes of the item and storing the search request in a search index based on the requested category and the requested attribute(s). The search index includes one or more categories and each category is defined by a taxonomy of attributes. The search index is then searched for any previously stored search requests that match the requested category and the requested attribute(s), a result of the search is determined and a search response that includes the result of the search is sent.

61 Claims, 32 Drawing Sheets

(56) References Cited

U.S. PATENT DOCUMENTS

| | | |
|---|---|---|
| 6,286,002 B1 | 9/2001 | Axapoulos et al. |
| 6,298,369 B1 | 10/2001 | Nguyen |
| 6,381,594 B1 | 4/2002 | Eichstaedt et al. |
| 6,466,918 B1 | 10/2002 | Spiegel et al. |
| 6,484,162 B1 | 11/2002 | Edlund et al. |
| 6,489,968 B1 | 12/2002 | Ortega et al. |
| 6,574,624 B1 | 6/2003 | Johnson et al. |
| 6,678,680 B1 | 1/2004 | Woo |
| 6,732,088 B1 | 5/2004 | Glance |
| 6,745,178 B1 | 6/2004 | Emens et al. |
| 6,766,315 B1 | 7/2004 | Bratsos et al. |
| 6,782,383 B2 | 8/2004 | Subramaniam et al. |
| 6,785,671 B1 | 8/2004 | Bailey et al. |
| 6,845,448 B1 | 1/2005 | Chaganti |
| 6,983,273 B2* | 1/2006 | Banerjee et al. |
| 7,225,197 B2* | 5/2007 | Lissar ............ G06F 17/30604 707/700 |
| 7,565,425 B2* | 7/2009 | Van Vleet ........ G06F 17/30867 707/999.01 |
| 7,987,208 B2* | 7/2011 | Kramer ............ G06F 17/30864 707/802 |
| 2001/0044837 A1 | 11/2001 | Talib et al. |
| 2002/0083053 A1* | 6/2002 | Richard ............ G06F 17/30011 |
| 2002/0103876 A1* | 8/2002 | Chatani ............ G06F 17/30864 709/217 |
| 2002/0120506 A1 | 8/2002 | Hagen |
| 2002/0157026 A1 | 10/2002 | Brown |
| 2003/0204447 A1 | 10/2003 | Dalzell et al. |
| 2003/0204449 A1 | 10/2003 | Kotas et al. |
| 2004/0093327 A1* | 5/2004 | Anderson et al. ............ 707/3 |
| 2004/0098375 A1* | 5/2004 | DeCarlo, III ..... G06F 17/30867 |
| 2004/0128616 A1* | 7/2004 | Kraft ............... G06F 17/30011 715/239 |
| 2004/0138996 A1 | 7/2004 | Bettenburg et al. |
| 2004/0249682 A1 | 12/2004 | Demarcken et al. |
| 2004/0249798 A1 | 12/2004 | Demarcken et al. |
| 2004/0249799 A1 | 12/2004 | Demarcken et al. |
| 2004/0267723 A1* | 12/2004 | Bharat ............... 707/3 |
| 2005/0021506 A1 | 1/2005 | Matsubayashi et al. |
| 2005/0071328 A1 | 3/2005 | Lawrence |
| 2005/0076003 A1 | 4/2005 | Dubose et al. |
| 2005/0076023 A1* | 4/2005 | Wu ................. G06F 17/30864 |
| 2005/0080772 A1* | 4/2005 | Bem ................. 707/3 |
| 2005/0119995 A1 | 6/2005 | Lee |
| 2005/0125397 A1 | 6/2005 | Gross et al. |
| 2005/0144162 A1 | 6/2005 | Liang |
| 2005/0154723 A1 | 7/2005 | Liang |
| 2005/0160107 A1 | 7/2005 | Liang |
| 2005/0165744 A1 | 7/2005 | Taylor et al. |
| 2005/0228780 A1 | 10/2005 | Diab et al. |
| 2005/0240557 A1 | 10/2005 | Rorex et al. |
| 2005/0251510 A1* | 11/2005 | Billingsley ....... G06F 17/30864 |
| 2005/0267870 A1 | 12/2005 | Everett-Church et al. |
| 2005/0283468 A1 | 12/2005 | Kamvar et al. |
| 2005/0283470 A1 | 12/2005 | Kuntzman et al. |
| 2006/0074874 A1* | 4/2006 | Day et al. ........... 707/3 |
| 2006/0149712 A1* | 7/2006 | Kindsvogel ....... G06F 17/30312 |
| 2006/0155581 A1 | 7/2006 | Eisenberger et al. |
| 2006/0195414 A1 | 8/2006 | Arrouye et al. |
| 2006/0195428 A1 | 8/2006 | Peckover |
| 2006/0195481 A1 | 8/2006 | Arrouye et al. |
| 2007/0067275 A1 | 3/2007 | Shekel |
| 2012/0324551 A1 | 12/2012 | Bretschneider |

OTHER PUBLICATIONS

Kiessling, Werner, "Preference Queries with SV-Semantics," Advances in Data Management 2005, pp. 15-26, CSI, 2005.

Kim, Jae Kyeong et al., "A personalized recommendation procedure for Internet shopping support," Electronic Commerce Research and Applications 1, pp. 301-313, Elsevier Science B.V., 2002.

* cited by examiner

FIG. 2
(PRIOR ART)

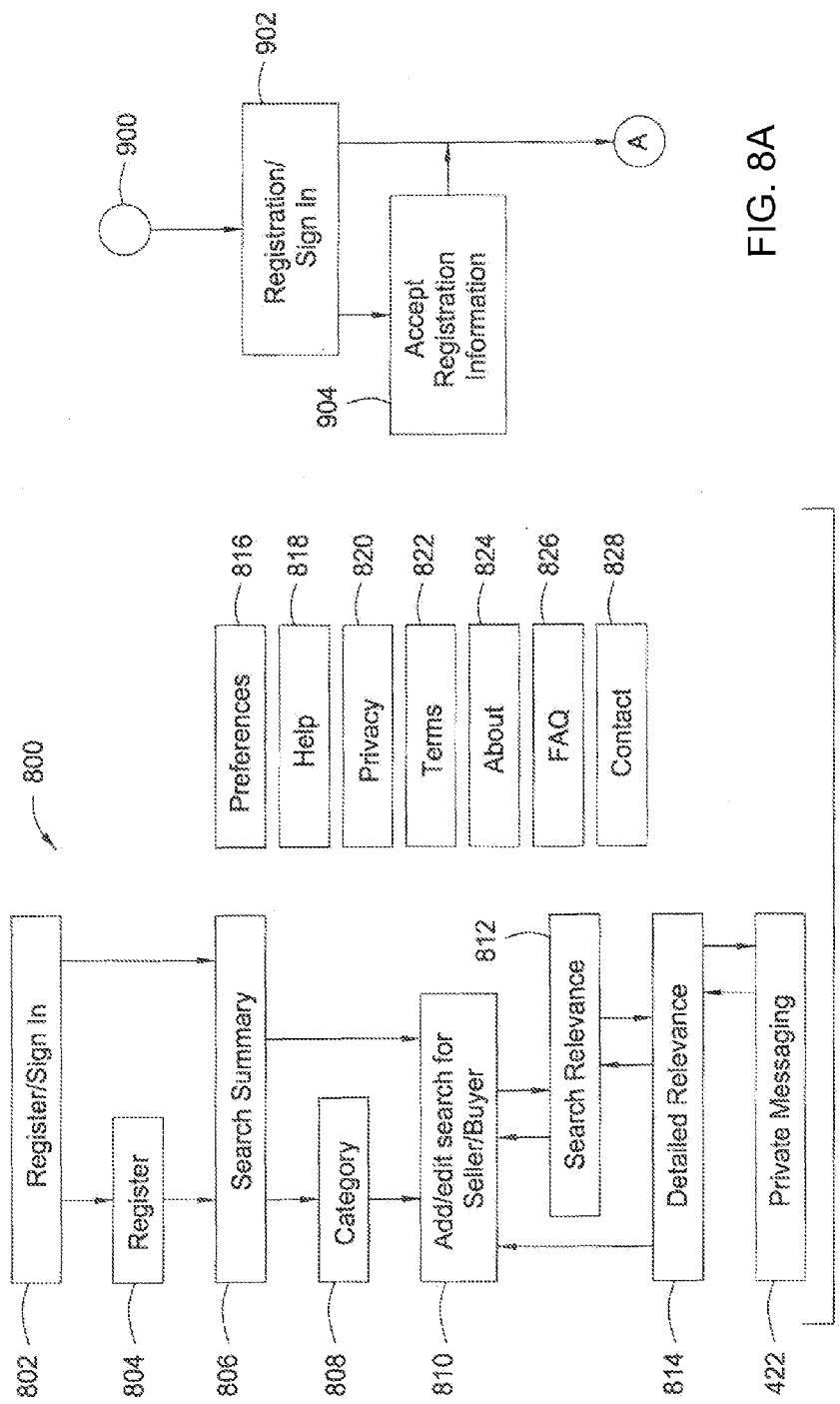

| Search relevance for possible sellers | | | | | |
| --- | --- | --- | --- | --- | --- |
| 1700<br>Description | 1702<br>Since | 1704<br>Price | 1706<br>Relevance<br>P F G VG E | 1708<br>Private<br>Messages | 1710<br>Times<br>Replied | |
| 1999 beauty - must see first!!! | Jun 19 | $22,000 | 92% | 3 | 1 | Delete |
| Yellow Mustang for sale | May 11 | $12,000 | 80% | 1 | | Delete |
| Selling great car - fast | May 18 | $15,000 | 71% | | | Delete |
| One-owner Mustang for sale | Jun 14 | $18,000 | 53% | | | Delete |
| Selling my mustang | Jun 16 | $20,000 | 45% | | | Delete |
| 98 Ford Mustang 345-GFW | Jul 29 | $12,750 | 37% | | | |

Home
Category
Find seller
Find buyers
Preferences

Username | Help | Sign out (.029 seconds)

1712

Privacy Policy

Details of possible sellers

| | | |
|---|---|---|
| Description | 98 Ford Mustang 345-GFW | 1999 beauty - must see first!! |
| Make | Ford | Ford |
| Model | Mustang | Mustang |
| Color | Red | Red |
| Doors | 4 | 2 (not a match) |
| Year | 1998 | 1999 (not a match) |
| Options | Power steering | (unknown) |
| Price | $18,000 to $25,000 | $22,000 |
| Keywords | Clean, will deliver | Just one owner!" |

— 1800, 1802, 1804

Username | Help | Sign out
Relevance is 92%

Home
Category
Find seller
Find buyers
Preferences

Previous conversation with this seller — 1808
From me: My budget is $20k can we discuss?
From Seller: No, thanks. My price is firm.

Send this seller a new message — 1810
How about we split the difference? |

1812 — This seller will only permit 1 more message - make yours the best!

◁ ◁ 1 OF 6 ▷ — 1806

1814 — Never show again

Jun 12
Jan 12

Print — 1816

Privacy Policy

Our privacy policy

Our Privacy Policy is very simple and is based on the fact that the less we know about you, the better we can serve you.

820

Summary:
 We do not collect any personal information.
 At your option, we collect your e-mail address and you can change or delete it at any time.
 We do not share, trade, or sell your e-mail address.
 We do not use Web beacons, Web bugs, adware, spyware, or spam.
 We do not create or collect behavioral profiles.
 We do not collect your IP address.
 We do not permit banner or popup ads.
 This privacy policy will change whenever we think of more ways to protect your privacy.

Fine Print: Click here

Home
Category
Find seller
Find buyers
Preferences

Username | Help | Sign out

FIG. 20

Our privacy policy

Our Privacy Policy is very simple and is based on the fact that the less we know about you, the better we can serve you.

Fine Print:

This privacy policy applies to all information we collect from this Website. By using a Persistent Search Engine, you are granting us permission to contact you under the terms of our End User License Agreement.

We may be required to share your e-mail address to (i) comply with law, (ii) enforce or apply the terms of any of our user agreements, (iii) protect our rights, property or safety or those of others, or (iv) become involved in a business divestiture, sale, merger, or acquisition of all or a part of our business.

We recognize that when you choose to provide us with your e-mail address and you trust us to act in a responsible manner. We will store it with no less than the same reasonable level of care we store our own proprietary and confidential information. However, no realistic security precautions are perfect, and we can neither guarantee, nor accept liability for, information security. This is one reason why we only collect your e-mail address.

We reserve the right to change this policy at any time. It is our intent to make changes only to the extent necessary to comply with applicable laws, improve functionality, or improve your options for managing your privacy and building trust. If it becomes necessary to make changes to this policy such changes will be indicated and will be effective on the date the new policy.

Should you have any questions or concerns about this policy, please contact us.

This version of our privacy policy is effective as of October 1, 2004 and supersedes all previous versions.

Username ¦ Help ¦ Sign out

Home
Category
Find seller
Find buyers
Preferences

SYSTEM, METHOD AND APPARATUS FOR ELECTRONICALLY SEARCHING FOR AN ITEM

PRIORITY CLAIM

This patent application is a continuation application of U.S. patent application Ser. No. 11/321,155 filed on Dec. 28, 2005 entitled "System, Method and Apparatus for Electronically Searching for an Item", which is a non-provisional application of U.S. patent application 60/640,156 filed on Dec. 28, 2004, both of which are hereby incorporated by reference in their entirety.

FIELD OF THE INVENTION

The present invention relates generally to the field of computerized information retrieval and, more particularly, to a system, method and apparatus for electronically searching for an item.

BACKGROUND OF THE INVENTION

With a budget of more than $5 billion, Proctor & Gamble is the world's largest advertiser. It is very bad news for network TV when its P&G's Global Marketing Officer Jim Spangle says that today's marketing model is broken. This can be seen everywhere. Over the last ten years, American Express has reduced its TV network spending from 80% of its budget to under 30%. This trend can be seen in virtually every category.

A business model that has worked of over 50 years is slowly collapsing. Over the last decade, Nielsen reports that network TV has seen its audience decline 20% when the U.S. population actually grew by 30 million. During this time, the advertising cost to reach buyers has nearly tripled.

How bad will it get? A glimpse of the future can be seen in today's tech-savvy males aged 18-32. For them, traditional advertising is a complete waste of money. A Wired Magazine article documented how they are virtually impossible to market to. The article was called "The Lost Boys."

Where will the estimated $75 billion in annual network TV advertising end up? Amex CMO John Hayes says that there is no immediate place to redirect ad budgets but warns that "those who are unprepared for change will obviously suffer the consequences." Forrester Research's Chris Sharon warns that network TV have a lot at stake in the status quo, so it will not be fast to look elsewhere. David Poltrack, head of research at CBS, believes that if advertisers and marketers abandon network TV, the "entire marketing infrastructure of the country and the economy is going to be diminished." Not surprisingly, Viacom is looking at ways to spin-off CBS.

Viacom is not alone. Rupert Murdock's News Corp commissioned McKinsey & Company to figure out how to transition from network TV to the Internet. In August 2005, News Corp reported plans to create a major portal and expand on the Internet. Murdoch said, "There is no greater priority for the company today" and announced plans to spend about "$2 billion on Internet acquisitions."

Jupiter Research predicts that online advertising will overtake magazine advertising in 2007 when total online ad spending hits $13.8 billion, or 6% of offline ad spending. The CEO of the Direct Marketing Association put it bluntly when he said it is at a "critical juncture in its history".

With respect to Internet search engines, billions of dollars are already being redirected to the Internet, and firms want to benefit from this in the same way as Google has. Google now has a market valuation of more than four times Ford and General Motors combined. The reason why search engine companies are so hot is simple—70% of online purchases start with a search. Thousands of search engine marketing (SEM) companies have appeared almost overnight to help advertisers place these billions of redirected dollars. The most powerful eCommerce brands are now investing heavily in search technologies so that they can claim their share of this 70%.

As shown in FIG. 1, typical search engine technologies 100 in accordance with the prior art use keyword search engines 102 that include a keyword search index 104 communicably coupled to a data storage 106 and sponsored links 108. The keyword search index 104 is populated with terms used by buyers 110 when conducting a search. The keyword search engine 102 scours the Internet (World Wide Web) 112 for documents or web pages that contain the keywords. The documents, web pages or relevant data to link or point to such document and web pages are stored in data storage 106, which is used to further populate the keyword search index 104. The searching, storing, selecting mechanisms are extremely complicated and require massive data storage and processing power. Sellers 114 typically purchase the option to have their sponsored links 108 included in the search results provided to buyer 110 based on various criteria. As a result, advertising drive current search engine technologies.

In spite of their recent success, current search engine technologies still leave lots of room for improvement:
  98% of Google's revenue comes from advertising, and an estimated 10-30% of it is from "click fraud" where people intentionally click on ads to drain rival company budgets. Google's CFO said, "Something has to be done about this really, really quickly, because I think, potentially, it threatens our business model".
  New search engine technologies are often wasted. When Google introduced its desktop search capability, its rivals launched free copycat services. Technologies (1) with no direct revenue models that (2) can be copied are great for users but have a smaller impact on profitability and differentiation.
  New, unique technologies need to be defensible. No firm wants to be the next Netscape—a firm that was specifically targeted and quickly crushed by Microsoft.
  Current technologies are wasteful. When Yahoo announced that it had indexed billions more Web pages than Google, search engine expert Danny Sullivan said, "Screw size! I dare Google & Yahoo to report on relevancy . . . . You need the whole haystack! Here, if I dump it all on your head, can you find the needle now?"
  Search engine relevancy is becoming a key goal for all brands. In October 2005, Microsoft CEO Steve Balmer said "50% of all searches do not go to desired outcome . . . people can't find what they are looking for . . . relevance is job one."
  Search engine relevance is currently based on complex algorithms that try to anticipate and analyze what a person wants. These continue to get more complex with diminishing improvements.
  To improve relevance, search engine technologies attempt to capture more and more personal information. This is inconsistent with what people want because of increased fraud and identity theft, which is now the fastest growing crime in America.
  The new industry of Search Engine Marketing (SEM) firms now manipulates search results to satisfy the needs of the advertiser and not the buyer. The best "sponsored links" are generally sold to advertisers that pay the most money. The ranking of "organic" search results can also be manipulated to the point where the search results have little to do with what was requested. Not at all buyer-centric.

The amount of feedback and marketing information available to advertisers is limited. There is currently no way to measure or act upon partial interest by measuring "close hits" or "lost sales."

Current technologies do not respect the time of the consumer because the results are often not relevant. Clicking on a link often leads to more time searching a Website.

Current search engine technologies do not maximize the Internet's full potential because they do not give Sellers proactive tools. They still have to wait for a Buyer to click on a sponsored link or organic listing. This is the business equivalent to a teenage girl sitting by the phone waiting for her boyfriend to call.

The last two points are worth further explanation with the typical Google search result. For example, FIG. 2 is an example of a user interface and search result in accordance with the prior art. It is typical for Google to return a bewildering array of more than 6 million results 200. The "organic" results 202 are on the left and the "sponsored links" 204 are on the top left and on the right. Ninety-eight percent of Google's revenue comes from these sponsored links 204. Thousands of SEM companies help advertisers position themselves close to the top of organic 202 and sponsored search results 204 to increase the likelihood of being noticed by the buyer.

Eye-tracking technologies illustrate what gets noticed:
The sponsored links above the organic listing gets some.
The first three organic listings on the left get the most.
The sponsored links on the right get fewer results.
People don't go down the results very far.

These studies reveal show that people do not want to spend lots of time searching, and advertisers are 100% dependent on being found by the person. What is needed is a new type of search engine technology that solves these problems.

With advertising, there is a delicate balance between what is good for a consumer and what is good for an advertiser. For example, what is good for a consumer is almost always bad for an advertiser, and visa versa:

80 million people have signed up for the Do Not Call list, but this has hurt the telemarketing industry.

Spam is incredibly cost-efficient, but alienates consumers.

Privacy policies and trust seals from firms like BBBOnline and TRUSTe were supposed to protect consumers, but have been reduced to legal disclaimers that protect companies.

Accurate personalization can increase click-through rates, but collecting the necessary information can be intrusive.

Advertising reduced prices are almost always used to attract new consumers, but this erodes margins and attracts the least loyal consumers.

What is needed is a new search engine technology that creates a win-win for both consumers and advertisers.

Current search engine technologies have specific flaws. From an eCommerce perspective, current search engine technologies use the basic design shown in FIG. 1. While hugely profitable, this design has significant problems:

Sellers create a Website, with the possible help from Search Engine Marketing (SEM) companies. These companies attempt to manipulate the algorithms used by a search engine when it ranks "organic" search results. This manipulation is good for Sellers and not good for Buyers.

This, along with billions of other Web pages, are "scraped" or "crawled" by the search engine and put into Data Storage and Search Index for later access. Billions of Web pages are analyzed and it is estimated that Google requires over 150,000 servers to complete searches by sheer brute force:

On average, a single query reads hundreds of megabytes of data and consumes tens of billions of CPU cycles.

Google's PageRank algorithm performs an objective measurement of the importance of Webpages by solving an equation of more than 500 million variables and 2 billion terms.

At this scale, some limits of massive server parallelism become apparent, such as the limited cooling capacity of commercial data centers.

Sellers, with the possible help of SEM companies, use their advertising budgets to pay for Sponsored Links that are also added to the Search Index. The manipulation is dependent on the amount of money the Seller is willing to pay, whether or not the Seller's offer has anything to do with what the Buyer wants. This again is good for Sellers and not good for Buyers.

Sellers must wait for a Buyer to type a specific keyword. Nothing happens until then, which is not good for Sellers.

The search engine does not know in advance what the Buyer wants, so when the Buyer types one or more keywords, the search engine must have sufficient hardware and complex algorithms to return the results quickly. According to Urs Hoelzle, Google's Google's VP of Engineering, "exactly what will be searched for on any given day is never predictable [so] keeping the 10 billion pages of the Web close at hand is a daunting challenge."

The search results have more to do with the Seller's manipulation than the Buyer's needs. This lack of relevance, plus the hundreds, thousands, or even millions of results, make analysis of the search results complex, which is not good for the Buyer.

Some search engines technologies use behavioral and/or tracking methods to attempt to increase the relevance of the search results for the Buyer. This potentially invades the privacy of the Buyer.

If the Buyer clicks on an organic link in the Search Index, control is passed to the Seller's Website. Once there, the Buyer is left to navigate the Website with no additional help. This can be very time consuming. In some cases, the Buyer must register or answer personal questions to get the desired information from the Seller.

If the Buyer clicks on a sponsored link in the Search Index, the Seller is charged a fee and control is passed to the Seller's Website. It is possible for anyone to click on a link, and the resulting "click fraud" hurts both the Seller and the search ending company. Again, the Buyer must navigate the Website to find the desired information.

If the Buyer does not click on an organic or sponsored link, the Buyer has little or no marketing intelligence to help learn from the event. There is no way to quantify a "close hit" or "lost sale." The Seller is in a very limited react mode.

Accordingly there is a need for a system, method and apparatus for electronically searching for an item that provides relevant search results, persistent searching and protects the privacy of its users.

SUMMARY OF THE INVENTION

The present invention provides a system, method and apparatus for electronically searching for an item that provides relevant search results, persistent searching and protects the privacy of its users. For example, the present invention reduces:

- Dependency that Search Engine companies have on advertising revenue. In doing so, this will also reduce click fraud. This will enable Search Engine companies to earn more revenue by providing more value to Sellers.
- The need to store billions of irrelevant Web pages. This will enable Search Engine companies to spend less on the cost of collecting and managing information that has little or no value.
- The need to collect personal information from Buyers and possibly even Sellers. Not collecting personal information builds trust because it reduces or eliminates the chance that it will be disclosed to the wrong party or abused in any way.
- The time required to find the desired item. This does much more than make the search process easier for the Buyer. It is well known that a Seller must save a Buyer either time or money. Reducing the time to find the right product or service permits Sellers to charge a premium price. This protects Seller margins.
- The need to continue searching at a linked Website. This again benefits both the Buyer by saving them time and the Seller by protecting their margins.
- The need for manipulating search results. This permits Buyers to find products and services based on Buyer needs without interference or comment from any other party.
- Cluttered, irrelevant results. This permits Buyers to quickly assess search results that are ranked by their own relevancy.

Moreover, the present invention increases:

- Relevance without more and more complex algorithms. This benefits all parties because Buyers and Sellers can find each other based on common interests in a clear and concise manner.
- Marketing information for advertisers, such as capturing "close hit" data from partial interest, and "lost sales" data from a Buyer that decided to continue with another Seller. This permits Sellers to learn from mistakes and position their products and services in a more efficient manner, even when the desired results are not achieved.
- Tools so Sellers can be more pro-active and not just wait for Buyers. This permits Sellers to take the initiative in locating Buyers in a proactive manner that does not violate the privacy of either party.
- Tools to get product and service information directly from Seller legacy systems instead of having to "scrape" it from Seller Websites.
- Knowing in advance what Buyers and Sellers want.

Moreover, the present invention makes it extremely easy for a Buyer to specify what they are looking for anywhere, anytime, and they control the final part of the searching and shopping process.

The present invention provides a way for Buyers and Sellers to meet in a way that is better for Buyers, Sellers, and the hosting Search Engine company. The present invention is based on the fact that many Buyers know what they want but are afraid to disclose this information for fear that it will be misused or manipulated. It is also based on the fact that Buyers value their time and appreciate help from Sellers locating relevant products and services. Finally, the present invention is based on the fact that Buyers with more money to spend tend to value their privacy more, and that savvy Sellers are eager to serve them in a manner that protects their margins while building trust.

The present invention also provides a Persistent Search Engine that captures the most valuable marketing information—unfulfilled Buyer demand. Every Buyer has a dream job, car, vacation, relationship, and so on. The present invention captures this valuable information and searches for it. If a match is found, relevant items are shown in a concise graphical manner controlled by the Buyer. If no matches are found, the Persistent Search Engine keeps looking while the Buyer does other things. This persistent search can continue indefinitely until the desired item is found. The Buyer can return to the Persistent Search Engine at any time to see how the search is progressing, or can be notified when relevant results are found. This solves the "daunting challenge" described by Google—knowing exactly a person wants to search for.

The real benefits from the Persistent Search Engine are for Sellers because each persistent search is really a lead from a Buyer actively looking for a product or service. These leads are much more valuable than clicks on organic or sponsored links because persistent searches contain the specific features disclosed by the Buyer in a private environment. These leads take the guesswork out of Sellers locating interested Buyers. They also give Sellers enough detail to enable personalized offers to Buyers.

The present invention also gives Sellers new proactive tools. The persistent search that permits Buyers to find Sellers is completely bi-directional, so it also permits Sellers to locate Buyers. This unique process not only permits Sellers to find Buyer searches based on common criteria, but the persistent nature of the Seller search permits them to immediately find Buyers when new searches are entered or old searches are modified. With this unique new tool, Sellers are no longer dependent on Buyers locating them.

In addition, both Buyers and Sellers can search, either one-time or persistently, on their own peer group to learn how others buying or selling the same products or services are performing. This permits both Buyers and Sellers to make adjustments in order to reduce waste and increase profitability. Each search result also has an imbedded secure, private messaging system that permits Buyers and Sellers to communicate directly. This saves time, protects identities, and establishes trust that is needed for long-term benefit of both Buyers and Sellers.

Moreover, the present invention eliminates the need to collect irrelevant information and therefore requires fewer resources to operate. It also introduces new revenue models and reduces the dependency on sponsored links and the resulting exposure to click fraud.

More specifically, the present invention provides a method for electronically searching for an item by receiving a search request comprising a requested category and one or more requested attributes of the item and storing the search request in a search index based on the requested category and the requested attribute(s). The search index includes one or more categories and each category is defined by a taxonomy of attributes. The search index is then searched for any previously stored search requests that match the requested category and the requested attribute(s), a result of the search is determined and a search response that includes the result of the search is sent. Note that this method can be implemented using a computer program embodied on a computer readable medium wherein the steps are performed by one or more code segments.

In addition, the present invention provides an apparatus for electronically searching for an item that includes a search index and a search engine communicably coupled to the search index. The search index includes one or more categories defined by a taxonomy of attributes. The search engine receives a search request comprising a requested category and one or more requested attributes of the item, stores the search request in the search index based on the requested category and the requested attribute(s), searches the search index for any previously stored search requests that match the requested category and the requested attribute(s), determines a result of the search and sends the result of the search. The apparatus may also include a user interface for entering the search request and receiving the result of the search, a data storage communicably coupled to the search engine, a brand layer communicably coupled to the search engine or a private messaging system communicably coupled to the search engine.

The present invention also provides a system for electronically searching for an item that includes a network, one or more user devices communicably coupled to the network, a user interface communicably coupled to the network, a search index and a search engine communicably coupled to the user interface and the search index. The user interface is used to enter a search request that includes a requested category and one or more requested attributes of the item and receive a result of the search. Note that the user interface can be resident on the one or more user devices. The search index includes one or more categories defined by a taxonomy of attributes. The search engine receives the search request, stores the search request in the search index based on the requested category and the requested attribute(s), searches the search index for any previously stored search requests that match the requested category and the requested attribute(s), determines the result of the search and sends the result of the search. The system may also include a data storage communicably coupled to the search engine, a brand layer communicably coupled to the search engine or a private messaging system communicably coupled to the search engine.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which:

Figure 2:
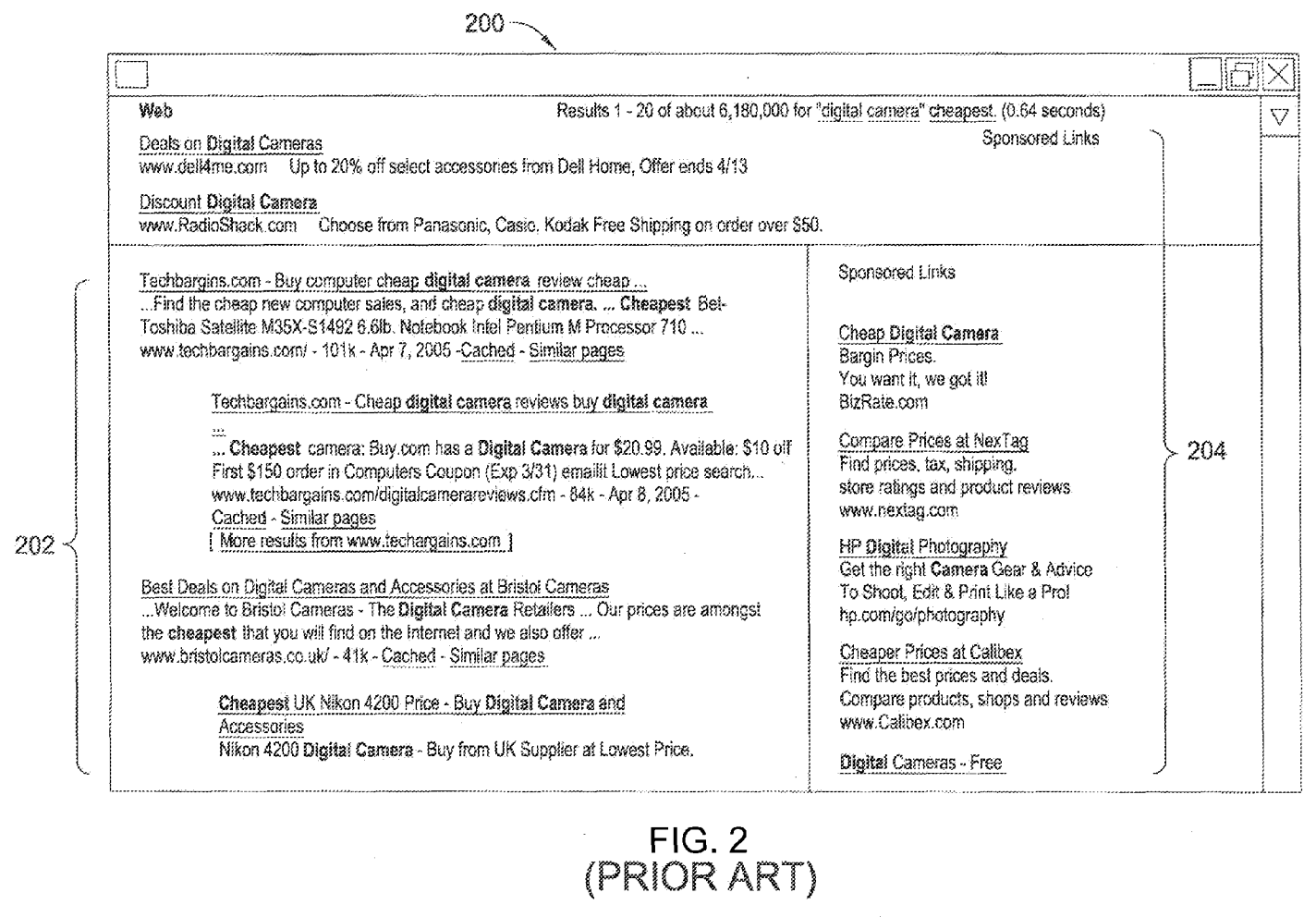

FIG. 2 is an example of a user interface and search result in accordance with the prior art;

FIG. 7 is a typical process flow of one embodiment of the present invention;

FIGS. 8A, 8B and 8C are flow charts of process flow in accordance with one embodiment of the present invention;

FIG. 14 is a screen used to create a new persistent search to find Sellers in accordance with one embodiment of the present invention;

FIG. 15 is a screen used to create a new persistent search to find Buyers in accordance with one embodiment of the present invention;

FIG. 16 is a screen showing the Persistent Search Engine results for a Buyer looking for Sellers in accordance with one embodiment of the present invention;

FIG. 17 shows the Relevance Details of the selected search item in accordance with one embodiment of the present invention;

FIG. 18 is a printer-friendly format of FIG. 17 in accordance with one embodiment of the present invention;

FIG. 19 is a screen showing search preferences for the current user in accordance with one embodiment of the present invention;

FIG. 20 is a screen showing a Privacy Policy in accordance with one embodiment of the present invention;

FIG. 21 is a screen showing the Privacy Policy in more detail in accordance with one embodiment of the present invention;

DETAILED DESCRIPTION OF THE INVENTION

Figure 1:
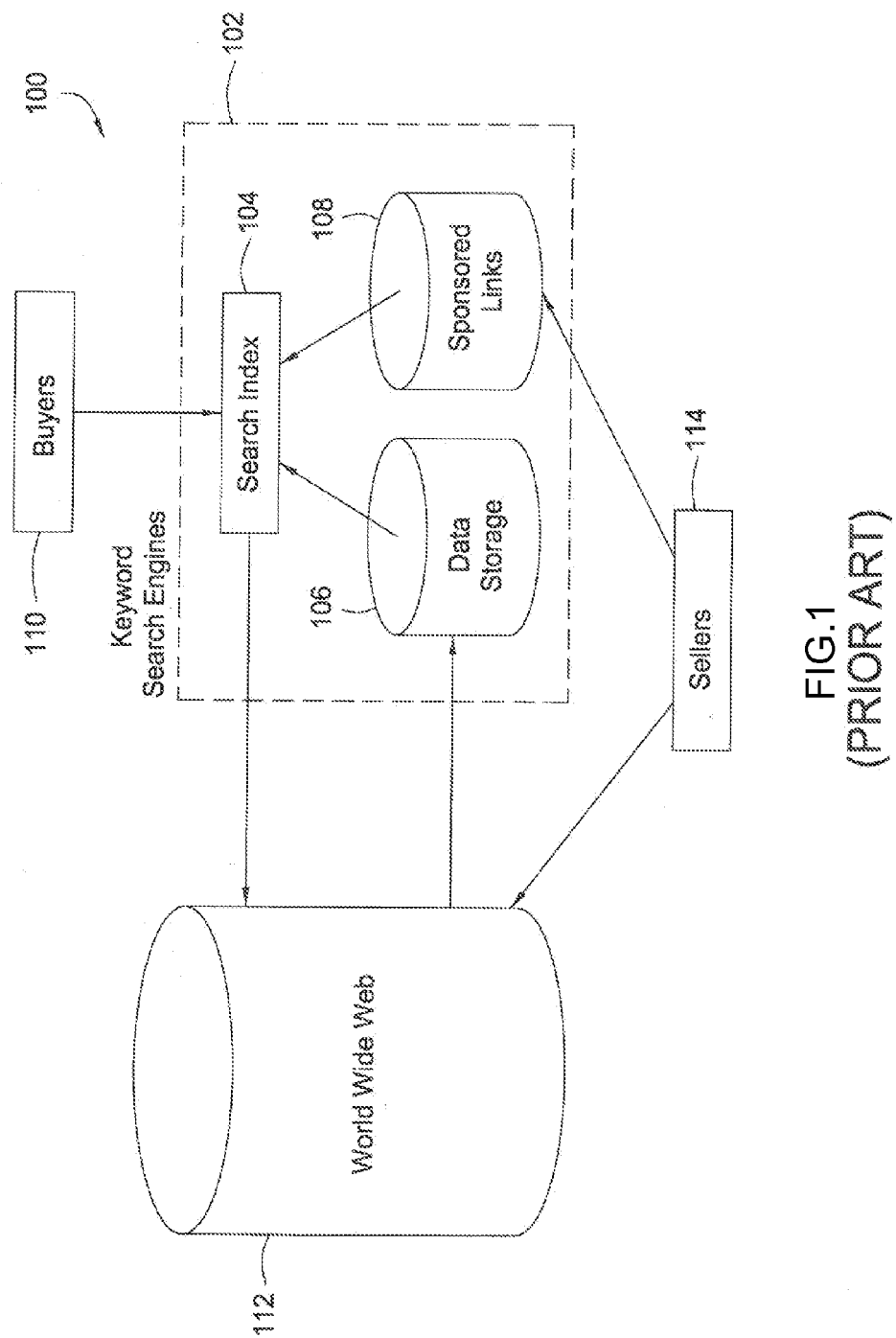
FIG. 1 is a block diagram of typical search engine technologies in accordance with the prior art.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to Internet related applications, but it will be understood that the concepts of the present invention are applicable to any interconnected database.

The present invention provides a system, method and apparatus for electronically searching for an item that provides relevant search results, persistent searching and protects the privacy of its users. For example, the present invention reduces:

Dependency that Search Engine companies have on advertising revenue. In doing so, this will also reduce click fraud. This will enable Search Engine companies to earn more revenue by providing more value to Sellers.

The need to store billions of irrelevant Web pages. This will enable Search Engine companies to spend less on the cost of collecting and managing information that has little or no value.

The need to collect personal information from Buyers and possibly even Sellers. Not collecting personal information builds trust because it reduces or eliminates the chance that it will be disclosed to the wrong party or abused in any way.

The time required to find the desired item. This does much more than make the search process easier for the Buyer. It is well known that a Seller must save a Buyer either time or money. Reducing the time to find the right product or service permits Sellers to charge a premium price. This protects Seller margins.

The need to continue searching at a linked Website. This again benefits both the Buyer by saving them time and the Seller by protecting their margins.

The need for manipulating search results. This permits Buyers to find products and services based on Buyer needs without interference or comment from any other party.

Cluttered, irrelevant results. This permits Buyers to quickly assess search results that are ranked by their own relevancy.

Moreover, the present invention increases:

Relevance without more and more complex algorithms. This benefits all parties because Buyers and Sellers can find each other based on common interests in a clear and concise manner.

Marketing information for advertisers, such as capturing "close hit" data from partial interest, and "lost sales" data from a Buyer that decided to continue with another Seller. This permits Sellers to learn from mistakes and position their products and services in a more efficient manner, even when the desired results are not achieved.

Tools so Sellers can be more pro-active and not just wait for Buyers. This permits Sellers to take the initiative in locating Buyers in a proactive manner that does not violate the privacy of either party.

Tools to get product and service information directly from Seller legacy systems instead of having to "scrape" it from Seller Websites.

Knowing in advance what Buyers and Sellers want.

Moreover, the present invention makes it extremely easy for a Buyer to specify what they are looking for anywhere, anytime, and they control the final part of the searching and shopping process.

The present invention provides a way for Buyers and Sellers to meet in a way that is better for Buyers, Sellers, and the hosting Search Engine company. The present invention is based on the fact that many Buyers know what they want but are afraid to disclose this information for fear that it will be misused or manipulated. It is also based on the fact that Buyers value their time and appreciate help from Sellers locating relevant products and services. Finally, the present invention is based on the fact that Buyers with more money to spend tend to value their privacy more, and that savvy Sellers are eager to serve them in a manner that protects their margins while building trust.

The present invention also provides a Persistent Search Engine that captures the most valuable marketing information—unfulfilled Buyer demand. Every Buyer has a dream job, car, vacation, relationship, and so on. The present invention captures this valuable information and searches for it. If a match is found, relevant items are shown in a concise graphical manner controlled by the Buyer. If no matches are found, the Persistent Search Engine keeps looking while the Buyer does other things. This persistent search can continue indefinitely until the desired item is found. The Buyer can return to the Persistent Search Engine at any time to see how the search is progressing, or can be notified when relevant results are found. This solves the "daunting challenge" described by Google—knowing exactly a person wants to search for.

The real benefits from the Persistent Search Engine are for Sellers because each persistent search is really a lead from a Buyer actively looking for a product or service. These leads are much more valuable than clicks on organic or sponsored links because persistent searches contain the specific features disclosed by the Buyer in a private environment. These leads take the guesswork out of Sellers locating interested Buyers. They also give Sellers enough detail to enable personalized offers to Buyers.

The present invention also gives Sellers new proactive tools. The persistent search that permits Buyers to find Sellers is completely bi-directional, so it also permits Sellers to locate Buyers. This unique process not only permits Sellers to find Buyer searches based on common criteria, but the persistent nature of the Seller search permits them to immediately find Buyers when new searches are entered or old searches are modified. With this unique new tool, Sellers are no longer dependent on Buyers locating them.

In addition, both Buyers and Sellers can search, either one-time or persistently, on their own peer group to learn how others buying or selling the same products or services are performing. This permits both Buyers and Sellers to make adjustments in order to reduce waste and increase profitability. Each search result also has an imbedded secure, private messaging system that permits Buyers and Sellers to communicate directly. This saves time, protects identities, and establishes trust that is needed for long-term benefit of both Buyers and Sellers.

Moreover, the present invention eliminates the need to collect irrelevant information and therefore requires fewer resources to operate. It also introduces new revenue models and reduces the dependency on sponsored links and the resulting exposure to click fraud.

Figure 3:
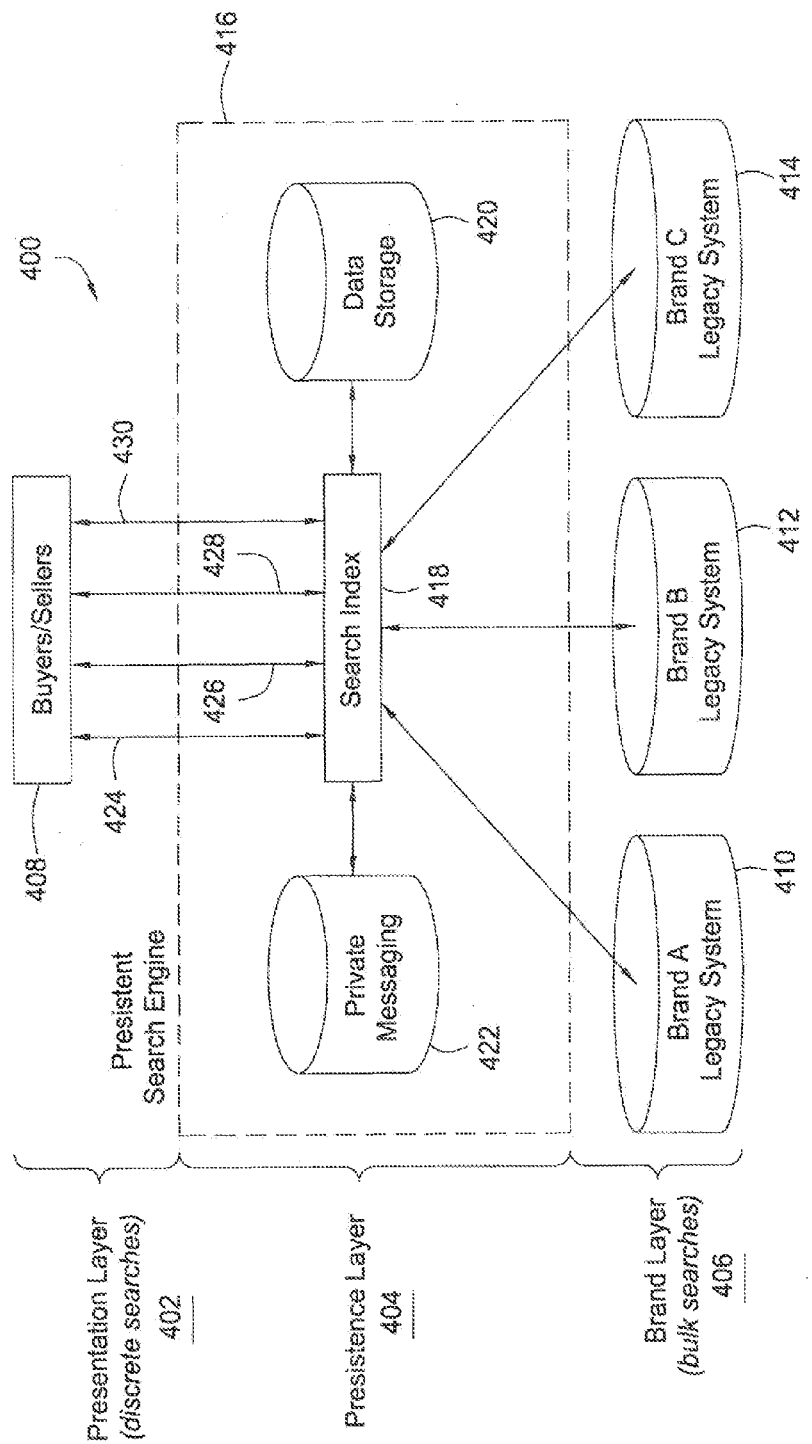
FIG. 3 is a block diagram of a system for searching for an item in accordance with one embodiment of the present invention.

Now referring to FIG. 3, a block diagram of a system 400 for searching for an item in accordance with one embodiment of the present invention is shown. The system 400 includes three layers: a presentation layer 402, a persistence layer 404 and a brand layer 406. The persistence layer 404 can be used alone or in combination with the presentation layer 402 and/or the brand layer 406. In other words, the persistence layer 404 is added to any Buyer or Seller 408 search and may be accessed on one of three ways:

1. With a Presentation Layer 402 to enable discrete searches by Buyers or Sellers 408 with their preferred device, such as PC, laptop, cell phone, PDA, or iPod. This is a stand-alone configuration where Buyers and Sellers 408 operate in a fully-functional and targeted manner.
2. With a Brand Layer 406 to enable bulk searches via XML or EDI by Buyers or Sellers 408 though legacy or similar systems 410 (Brand A), 412 (Brand B) and/or 414 (Brand C). This is an enterprise configuration that takes adds persistence to one or more established brands.
3. A combination of both discrete searches and bulk searches.

The Persistent Search Engine 416 is a unique type of "middleware" running on one or more servers. It only contains information important to and specified by Buyers and Sellers 408. At the present time, in a supply-driven economy, there are more products and services than there are Buyers. A visit to any department store or Web merchant makes this evident.

As such, Seller information may be linked to the Search Index 418 in bulk through the Brand Layer 406 using an XML or EDI interface to a Legacy Systems 410, 412 and/or 414. Bulk Buyer information may also be linked in the same manner. In addition, discrete Buyer or Seller 408 information may also be loaded directly into the Persistent Search Engine 416 by the Presentation Layer 402 using any Web-enabled device.

As a result, the present invention provides an apparatus 404 for electronically searching for an item that includes a search index 418 and a search engine 416 communicably coupled to the search index 418. The search index 418 includes one or more categories defined by a taxonomy of attributes. The search engine 416 receives a search request comprising a requested category and one or more requested attributes of the item, stores the search request in the search index 418 based on the requested category and the requested attribute(s), searches the search index 418 for any previously stored search requests that match the requested category and the requested attribute(s), determines a result of the search and sends the result of the search. The apparatus 404 may also include a user interface (presentation layer 402) for entering the search request and receiving the result of the search, a data storage 420 communicably coupled to the search engine 416, a brand layer 406 communicably coupled to the search engine 416 or a private messaging system 422 communicably coupled to the search engine 416. Note that the search index 418 is bi-directional between a buyer and a seller 424, the buyer and another buyer 426, the seller and the buyer 428, or the seller and another seller 430.

Figure 4:
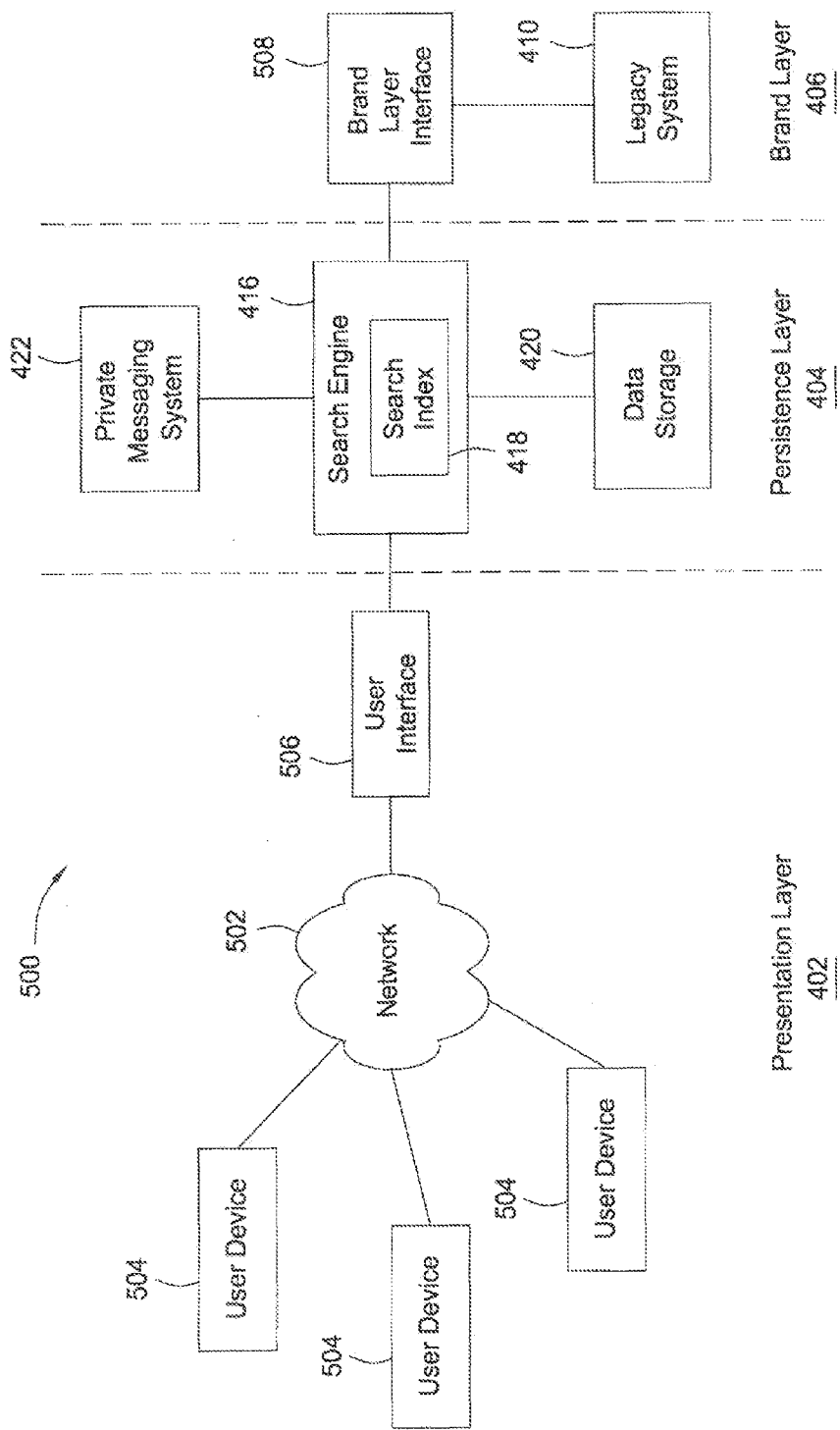
FIG. 4 is a block diagram of a system for searching for an item in accordance with another embodiment of the present invention.

As shown in FIG. 4, the present invention also provides a system 500 for electronically searching for an item that includes a network 502, one or more user devices 504 communicably coupled to the network 502, a user interface 506 communicably coupled to the network 502, a search index 418 and a search engine 416 communicably coupled to the user interface 506 and the search index 418. The user interface 506 is used to enter a search request that includes a requested category and one or more requested attributes of the item and receive a result of the search. Note that the user interface 506 can be resident on the one or more user devices 504. The search index 418 includes one or more categories defined by a taxonomy of attributes. The search engine 416 receives the search request, stores the search request in the search index 418 based on the requested category and the requested attribute(s), searches the search index 418 for any previously stored search requests that match the requested category and the requested attribute(s), determines the result of the search and sends the result of the search. The system 500 may also include a data storage 420 communicably coupled to the search engine 416, a brand layer interface 508 communicably coupled to the search engine 416 or a private messaging system 422 communicably coupled to the search engine 416. The search index is bi-directional between a buyer and a seller, the buyer and another buyer, the seller and the buyer, or the seller and another seller.

Figure 5:
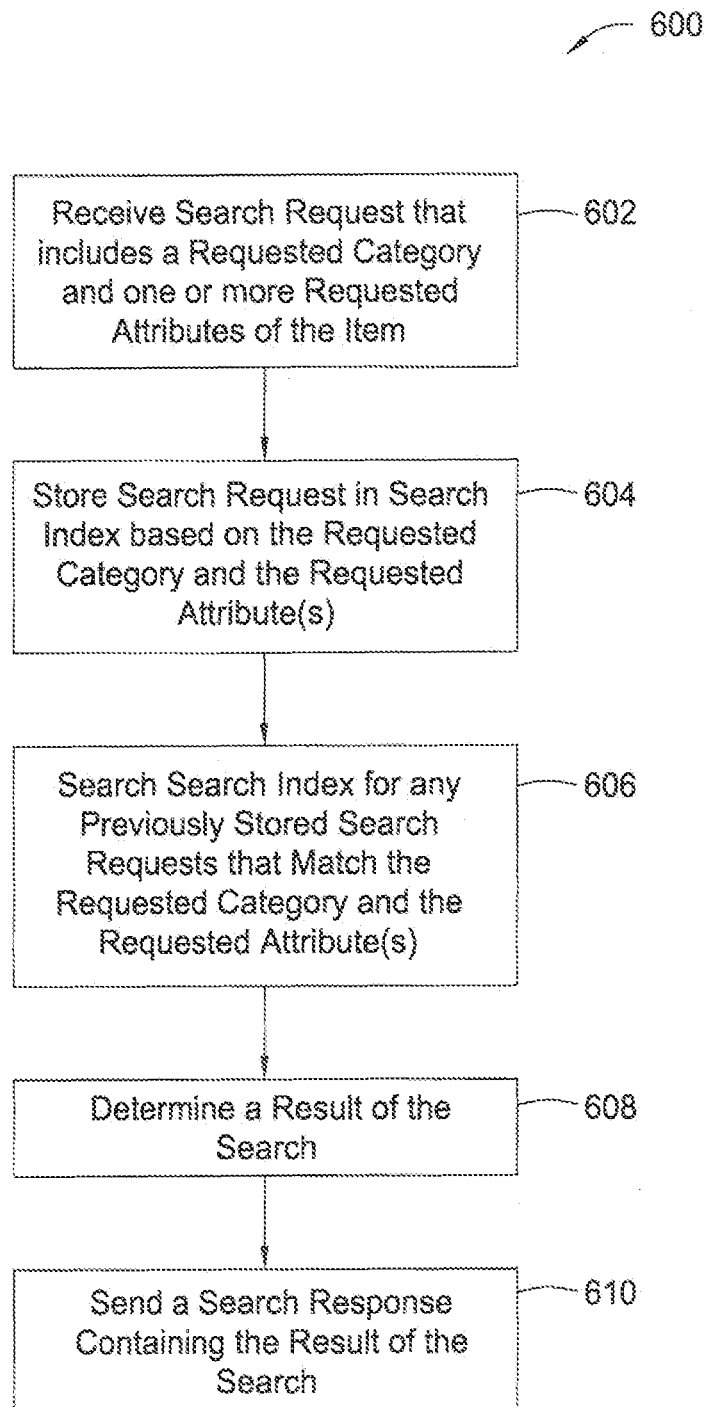
FIG. 5 is a flow chart of a method for searching for an item in accordance with one embodiment of the present invention.

Now referring to FIG. 5, a method 600 for electronically searching for an item is shown. The item may include a product, a service, a topic, a classified-type advertisement, a personal-type advertisement or a combination thereof. A search request is received in block 602 and stored in a search index in block 604. The search request can be created or initiated from a presentation layer, a persistence layer, a brand layer or a combination thereof. The search request can be submitted by a buyer, a seller, a buyer/seller, a "window shopper", a researcher, an interested user or a combination thereof. The search request includes a requested category and one or more requested attributes of the item. Each attribute can be defined by a question and one or more answers to the question, price, comments, feedback, etc. For example, it is possible to have a search just on price ("I am looking for any car over $100,000"). The search request may also include a price, a price range, a description, one or more comments, one or more keywords, a minimum feedback score for a user associated with any found stored search request or a combination thereof. The search request is stored based on the requested category and the requested attribute(s). The search request may include: an item posted for advertisement, exchange, lease, sale, trade or transfer by a user; an item sought by a user for advertisement, exchange, lease, sale, trade or transfer; information posted about an item provided by a user; information about an item sought by a user; a search for posted items that satisfy one or more criteria; a search for sought items that satisfy one or more criteria; a search for sought attributes; a search for sought information; a bulk search; a search for close hits that satisfy one or more criteria; a search for lost sales that satisfy one or more criteria; or a combination thereof.

The search index includes one or more categories and each category is defined by a taxonomy of attributes. The taxonomy can differ based on a language, a culture or a region associated with the search request. Moreover, the search index is capable of providing matches regardless of the language, the culture or the region associated with the search request. The search index is then searched for any previously stored search requests that match the requested category and the requested attribute(s) in block 606, a result of the search is determined in block 608 and a search response that includes the result of the search is sent in block 610. Each stored search request may include: an item posted for advertisement, exchange, lease, sale, trade or transfer by a user; an item sought by a user for advertisement, exchange, lease, sale, trade or transfer; information posted about an item provided by a user; or information about an item sought by a user. The stored search requests may match the requested category and the requested attribute(s) whenever: the attributes of the stored search requests are equal to or exceed the requested attributes; the attributes of the stored search requests are substantially similar to the requested attributes; the attributes of the stored search requests are within a range of the requested attributes; or a relevancy score for the stored search requests is not satisfied. The search response can be sent to a user specified device (e.g., a computer, a laptop, a handheld computer, an e-mail address, a personal data assistant, a telephone, a mobile telephone, a portable media player, a portable communications device, a facsimile device, a Web-enabled device or a combination thereof, etc.).

Other steps may include: creating the search request by selecting the requested category from the one or more categories and selecting the requested attributes from the taxonomy of attributes for the requested category; storing the price, the price range, the description, the comments, the keywords, the minimum feedback score or the combination thereof in the search index or in a data storage; updating the search index whenever a stored search request is added, changed or deleted; authenticating the received search request; deleting a stored search request; resubmitting a previously submitted search request; or linking information contained in a legacy database to the search index (the information can be linked via an XML or EDI index, loaded into the search index, loaded and indexed into a data storage or a combination thereof).

Another series of steps may include: detecting a trigger event; whenever the trigger event is detected, searching the search index for any stored search results that match the requested category and the requested attributes, and determining a new result of the search; and whenever the new result differs from the result, sending an updated search response comprising the new result of the search. The trigger event can be a newly received search request, a change in the search request, a specified time period, receipt of an update request, a change to the search index that would change the result of the search, a deletion of a stored search request or a combination thereof.

The stored search request typically does not contain any personal information or only contains personal information added by the user. For example, the present invention can remove any personal information from the received search request before the received search request is stored in the search index.

Figure 23:
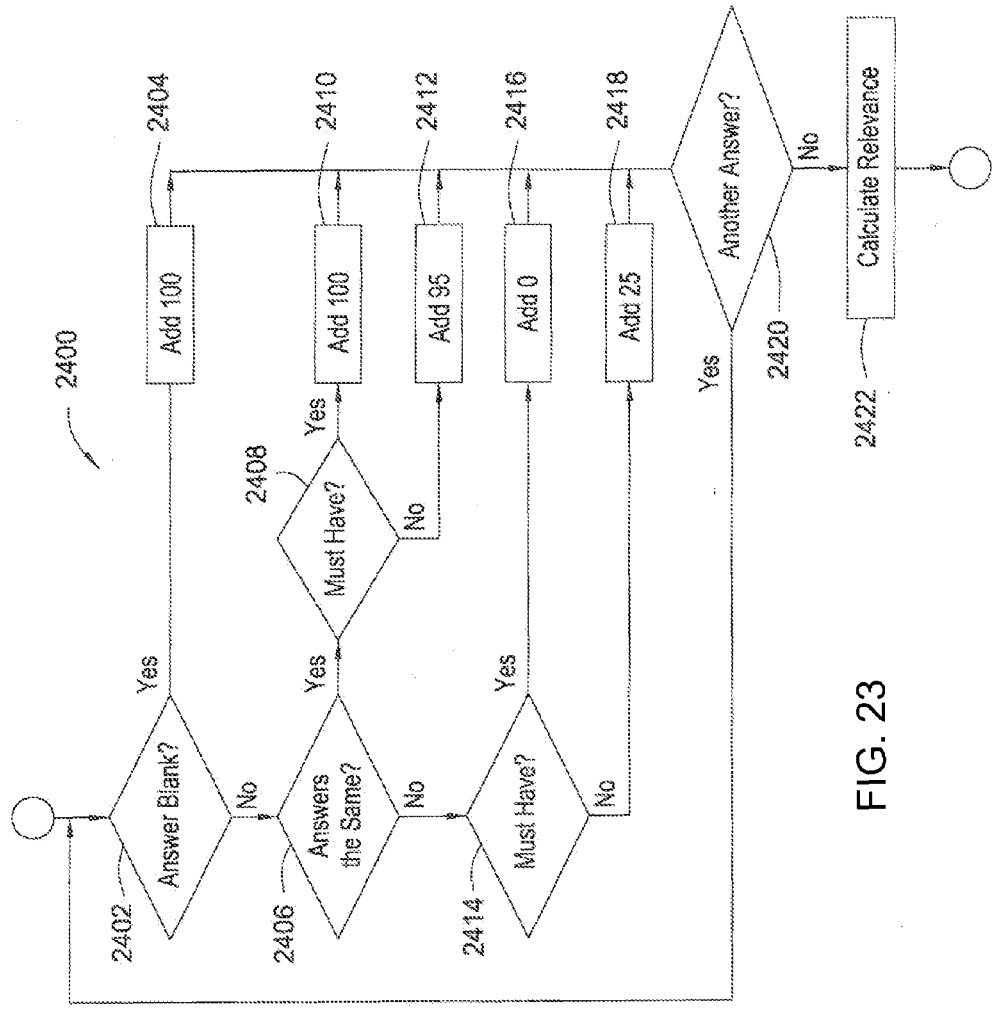
FIG. 23 is a flow chart showing one method to calculate the relative importance of any question and Answer pair in accordance with one embodiment of the present invention.

As will be described in more detail below, the present invention may determine a relevancy score for each found stored search request, which can be displayed graphically. The determination of the relevancy score can be based on one or more user preferences, a closeness of the requested attributes in the search request to the attributes of the stored search request, a distance between an item associated with a stored search request and a location of the user, a user specified budget or a combination thereof. As illustrated in FIG. 23, the determination of the relevancy score may include a sum of relevancy scores for each requested attribute in the search request divided by the number of requested attributes in the search request, wherein the relevancy score for each requested attribute comprises a first value whenever the requested attribute is not specified in the stored search request, a second value whenever the requested attribute matches the attribute of the stored search request and the requested attribute is required, a third value whenever the requested attribute that matches the attribute of the stored search request and the requested attribute is not required, a fourth value whenever the requested attribute that does not match the attribute of the stored search request and the requested attribute is required, and a fifth value whenever the requested attribute does not match the attribute of the stored search request and the requested attribute is not required. The relevancy score can be provided to the user associated with the stored search request, another interested user or a combination thereof.

The present invention may also include receiving one or more preferences associated with a user or the search request. The one or more preferences may include an urgency, a results per screen, an minimum required relevancy limit, a minimum required rating associated with the stored search request, one or more user devices that are to be used for communications, one or more messaging limits or a combination thereof.

In addition, the present invention may send a notification to a user whenever: the requested attributes of a received search request matches a stored search request associated with the user; a received search request is changed that previously matched the stored search request associated with the user; an item associated with a stored search request is located within a specified distance from a location of the user; the result of the search request by the user has changed; the result of the search request by the user has not changed or a relevancy score for the stored search requests is not satisfied. The notification may include a request to return to the stored search request or the result of the search, a link to return to the stored search request or the result of the search, a description of a reason for the notification, a message, a new search request or a combination thereof.

Moreover, the present invention may provide a messaging system between a user that submitted the search request and each user associated with the stored search requests that matched the requested attributes. The messages within the messaging system are private between the user that submitted the search request and each user associated with the stored search requests that matched the requested attributes and cannot be accessed by third parties. Furthermore, the messages within the messaging system do not contain any personal information about the user that submitted the search request and each user associated with the stored search requests that matched the requested attributes unless such personal information is added by one of the users. The messages within the messaging system do not have to be tied to a mail server or an e-mail address, but are typically logged and tied to the search request. The user that submitted the search request and each user associated with the stored search requests that matched the requested attributes can specify a limit on the number of messages that another user can send to them. The user can add an attachment or additional content to the messages within the messaging system if the attachment satisfies one or more criteria. The user can accept unsolicited offers, unsolicited messages, questionnaires, advertisements or a combination thereof if such offers, messages, questionnaires or advertisements satisfy one or more criteria.

The present invention may also receive feedback or comments regarding a user, a stored search request or a combination thereof, and associate the feedback or comments with the user or the stored search request or the combination thereof.

The above described steps can be repeated until a specified time period has elapsed, a specified number of searches are performed, the search request is changed, deleted or terminated by the user, the search request is changed, deleted or terminated by a system, the search request is replaced or a combination thereof. In addition, the step of searching the search index is halted after a specified number of matches have been found. Moreover, the above described steps (e.g., storing the search request, searching the search index, determining the result of the search, sending the search response, etc.) can be performed at a level of functionality associated with a user associated with the received search request.

Note that the methods, steps and processes described herein can be implemented using a computer program embodied on a computer readable medium wherein the steps are performed by one or more code segments.

The Persistent Search Engine 416 is driven by a collection of Buyer/Seller Categories, such as computers, houses, jobs, vacations, and so on. Each Category is driven by an associated Taxonomy, which is a collection of Questions and Answers that define the features and options got the products or services of that category. The following table shows a small part of the Taxonomy for buying and selling cars:

| Question | Answers |
| --- | --- |
| Make | Ford, Buick, Chrysler |
| Model | If Ford: Aerostar, Aspire, Bronco, Bronco . . . |
| | If Buick: Century, Electra, Lacrosse, LeSabre . . . |
| | If Chrysler: 300, 300C, 300M, Cirrus, Concorde . . . |
| Color | White, black, grey, blue, red, green, yellow . . . |
| Doors | 2, 3, 4, 5 |
| Year | 1990, 1991, 1992, 1993, 1994, 1995, 1996 . . . |
| Options | Power steering, power windows, side airbags . . . |

Using Taxonomy Questions and Answers like these, it is possible to describe virtually any car, whether it's currently made or not. These are entered by the Buyer and stored in the Search Index. Additional information, such as price and comments, can be stored in the Search Index or Data Storage. This is a highly efficient way to store Buyer information because there is no waste—only unfulfilled Buyer demand is required, and the needs of millions of Buyers can fit into a single server.

Sellers use the same Category and Taxonomy to find Buyers by matching common Answers to the same Questions. This bi-directional "dual search engine" enables several unique capabilities:

A new type of search engine that locates high-propensity Buyers, along with the features that are important to them.

The ability to position a product or service in a manner that is relevant to the Buyer. This personalization is made easy because the Buyer has described the item based on desired features. This "mass-customization" protects Seller margins while increasing the relevance to Buyers.

Requested products and services do not have to exist. In a demand-driven, mass-customized economy, Sellers learn what Buyers want and benefit by knowing new feature combinations that have yet to be commercialized. This is much more cost-effective than traditional market research and prototype testing.

Highly flexible, virtually unlimited demand-driven searching. For example, a Seller can search for Buyers looking for 20" monitors and then offer them a 24" monitor using new technology for the same price.

Precise definitions. Keywords are arbitrary, can be misspelled, and are different from culture to culture and language to language. In addition, Taxonomy Questions and Answers can be selected using a pointing device, such as a remote control, or can be selected by using the numbers on, say, a cell phone. This is important as more Web-enabled devices become mobile and keyboards are eliminated. Taxonomy Questions can have Answers entered on cell phones, PDAs, iPods, and so on.

Computer-aided learning. For Buyers, Taxonomy Questions and Answers provide education about features that they may not have known.

Differentiation. This permits Sellers to sell on features and not price, thus protecting margins. If, for example, a Seller's product has a unique feature, Buyers will quickly learn about it and know where to get it. Sellers not offering this feature will ranked lower in relevancy.

Quantified lost sales. Sellers not having a particular feature will have a lower relevancy but will learn from what worked for a competitive Seller.

The same individual can be both a Buyer and Seller at the same time. For example, a person could be using the Persistent Search Engine to sell an old car and buy a new car at the same time.

Peer marketing intelligence. Buyers can learn from other Buyers looking for similar products and services. Because of the bi-directional nature of the present invention, Sellers can also learn from other Sellers.

All of these Buyer and Seller searches are stored in Search Index 416 and/or Data Storage 420. The process of storing them and locating them later, either as the Buyer or Seller, is how all searches in the Persistent Search Engine 416 are made persistent. A new search, a change to an existing search, or an old search being terminated all update the Search Index immediately and trigger the Events Manager 700 as shown in FIG. 6.

Figure 6:
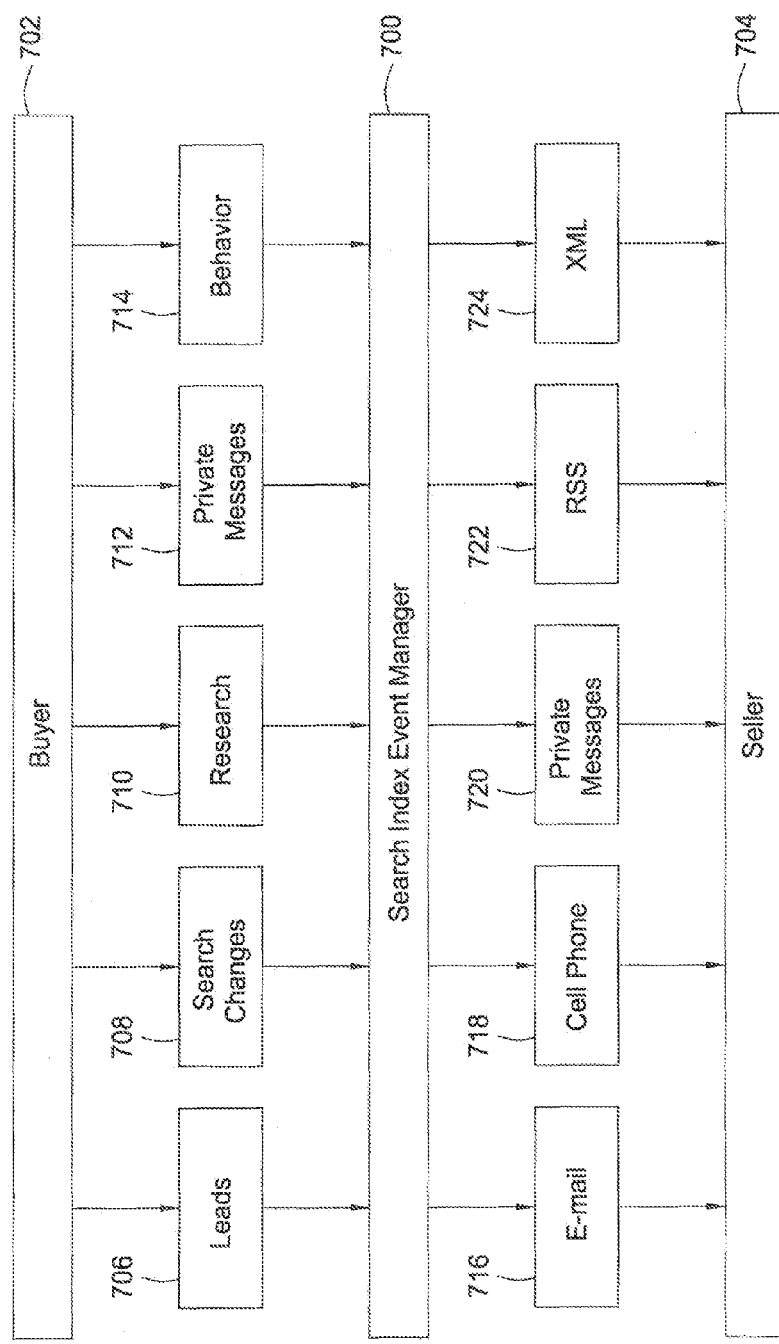
FIG. 6 is a block diagram of an Event Manager in accordance with one embodiment of the present invention.

FIG. 6 shows one preferred embodiment of how information flows from Buyer 702 to Seller 704. Part of the Persistent Search Engine 416 includes an Event Manager 700 that manages how information is distributed. For example, Buyer Leads can be sent to a Seller 704 by e-mail 716 and/or cell phone 718 and/or XML 722. The design of the Persistent Search Engine 416 is mirrored and is referred as a "dual search engine." As such, FIG. 6 also describes how information flows from Seller 704 to Buyer 702, Seller 704 to Seller 704, and Buyer 702 to Buyer 702. Examples may include:

A drop in price can notify interested Buyers 702 and/or other interested competitive Sellers 704.

A Buyer search that terminates can notify a Seller 704 with a similar product or service that the Buyer 702 may need help finding a similar product.

A Buyer 702 terminating a search because a product was purchased can quantify lost sales for similar Sellers 704. This also gives Sellers 704 one more opportunity to cross or up-sell the Buyer 702. For example, the Seller 704 may not sell the car but may be able to service the car.

Buyers 702 can watch from and learn from similar Buyers 702. Increasing Buyer peer pressure increases prices, while decreasing peer pressure increases Buyer power.

In exactly the same manner, Seller peer groups can educate Sellers 704 about how to adjust their products, services, and prices to maximize profitability.

Using the Event Manager 700, Buyers 702 are able to find leads 706, search changes 708, conduct research 710, send private messages 712 and monitor/observe behavior 714. The Events Manger 700 can notify Sellers 704 of changes or other information via e-mail 716, cell phone 718, private messages 720, RSS 722 and XML 724.

The efficient use of Search index 418 in the Persistent Search Engine 416 enables a highly-efficient process that eliminates the need to collect, store, and index data from billions of Web pages. According to published reports, Google has over 150,000 servers processing 200 million searches daily. This means that each server processes an average of just one search request per minute. The Persistent Search Engine 416 can process between 50 and 500 search request per second. The difference is that current search engine technologies manage content from billions of irrelevant Web pages in disk files, while the Persistent Search Engine 416 manages millions of relevant search requests in a memory-resident index.

Another component of the Persistent Search Engine 416 is the Private Messaging System 422. Every persistent search has an embedded facility that enables direct, private communication with the person who initiated the search. This enables several unique capabilities:

- Messages are search specific, making them relevant and focused.
- Messages cannot be accessed by bulk e-mailers.
- Messages operate fully within the Persistent Search Engine 416 and are not tied to any mail server or e-mail addresses. Any pictures, attachments, or links must be accepted and approved by the present invention before they are sent. As such, people receiving messages can be confident that they cannot carry viruses or other damaging payloads.
- Messages assure anonymity because they only include personal information if the sender intentionally discloses it in the text of the message.
- Each Buyer or Seller search has a log of all associated messages. This makes the search process easier to manage because related messages are shown with the search details.
- A Buyer or Seller can specify the number of consecutive messages that any individual can send for any given persistent search. If set to 2, then two consecutive messages can be sent by a sender before the messaging feature is automatically disabled for this search result. This counter is reset when the other party replies to a message. If set to 1, then a sender has just one chance to get a response. This eliminates multiple messages that are of no interest to the receiver, and it ensures that the sender keeps the messages relevant. Any receiver of messages can use this feature, so it protects both Buyers and Sellers.

Figure 12:
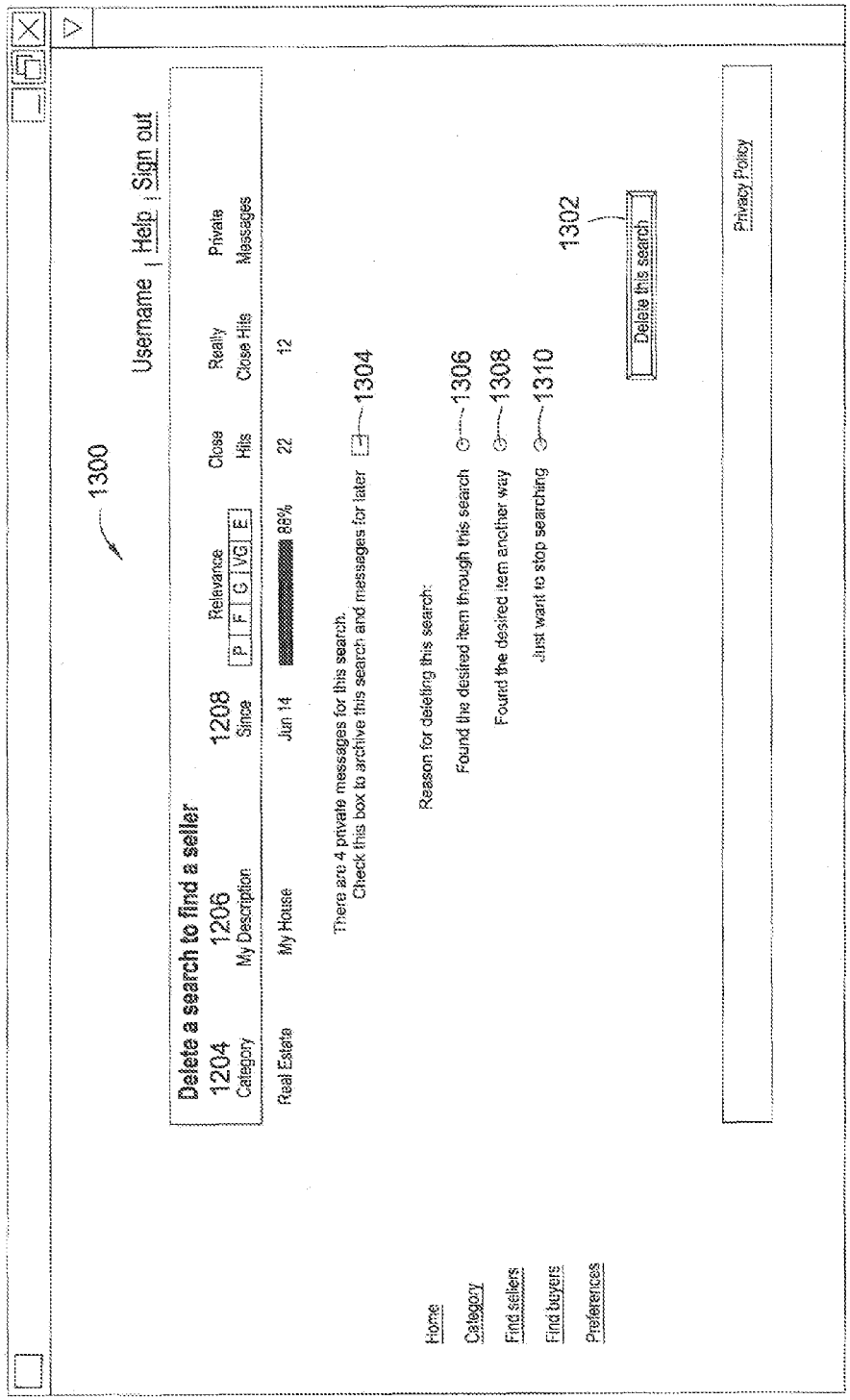
FIG. 12 is a screen shown when a persistent search is Deleted in accordance with one embodiment of the present invention.
Figure 14:
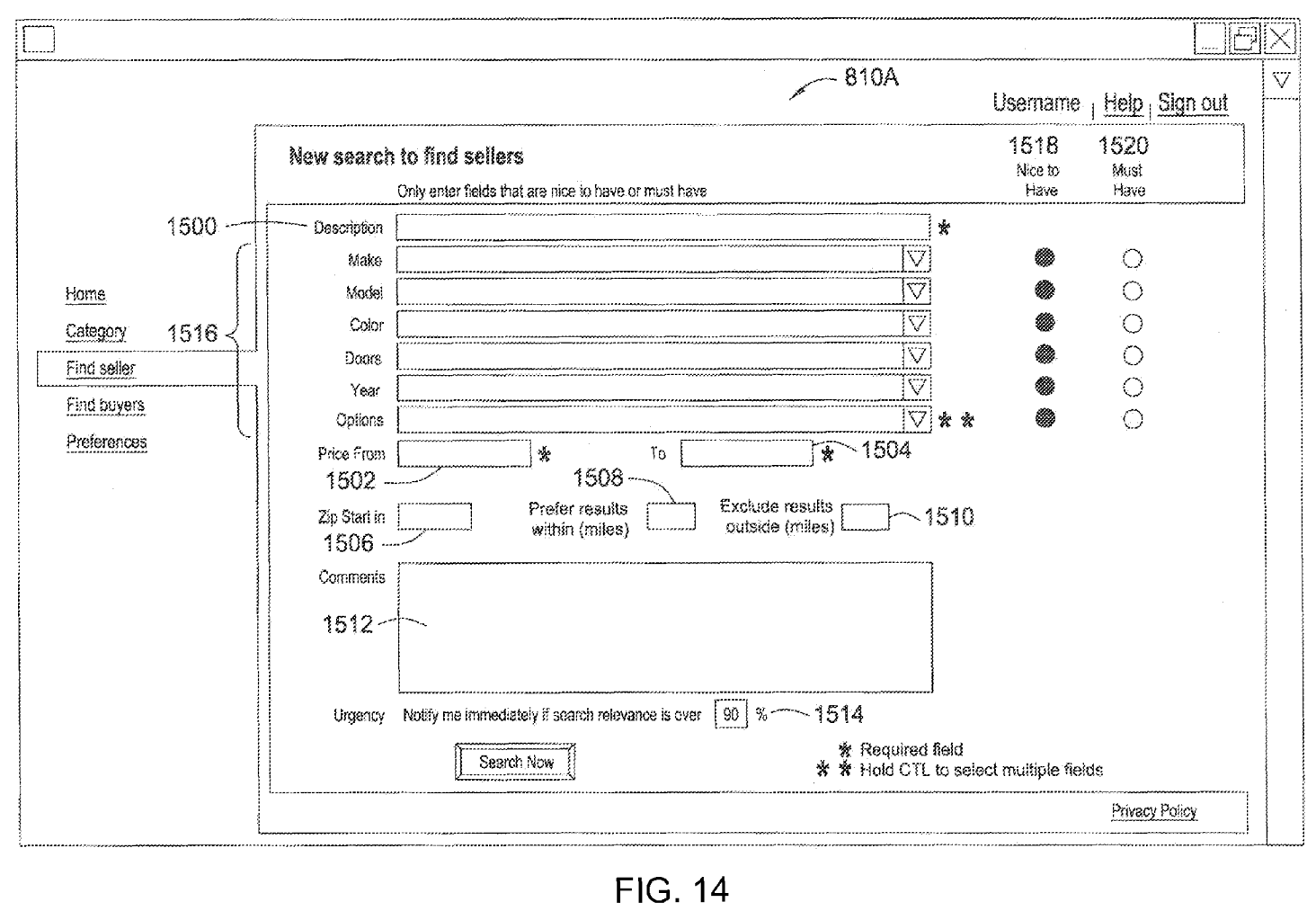

Now referring to FIG. 7, a typical process flow 800 of one embodiment of the present invention is shown. The process 800 begins when a user goes to the Register/Sign In screen 802 (FIG. 9) where the user either registers as a Buyer and/or Seller in screen 804 or Signs In. Once complete, the user goes to the Search Summary screen 806 (FIG. 12). The user can then select a category for a new search in Category screen 808 (FIG. 14). From there or from the Search Summary screen 806, the user can add/edit a search for a Seller/Buyer with screen 810*a* (FIG. 15), 810*b* (FIG. 16). From there or from the Search Summary screen 806, the user can go to the Search Relevance screen 812 (FIG. 17). From there, the user can go to a Detailed Relevance screen 814 (FIG. 19) to examine details about the stored search request. From there, the user can communicate with the Buyer/Seller using the Private Messaging system 422. It should be noted that once a person has registered or signed-on, they may use navigational links 816-828 to jump directly from one part of the present invention to another (e.g., Preferences 816 (FIG. 21), Help 818, Privacy 820 (FIG. 22), Terms 822, About 824, FAQ 826, Contact 828, etc.). For example, a Buyer looking at Detailed Relevance 814 can link to Preferences 816 to increase the number of search results per screen and then can link directly to Category 808 to start a new search.

Figure 8B:
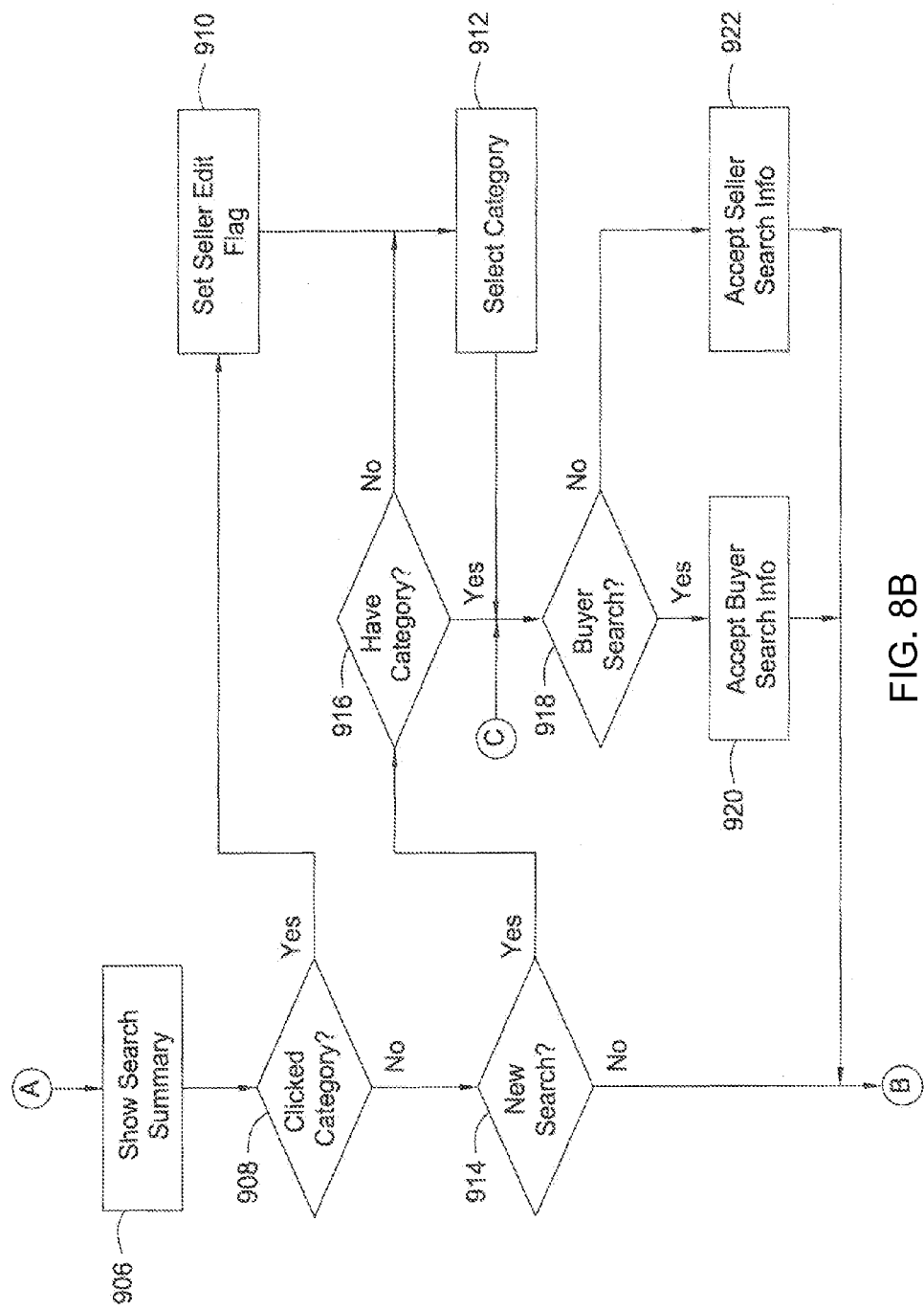
Figure 8C:
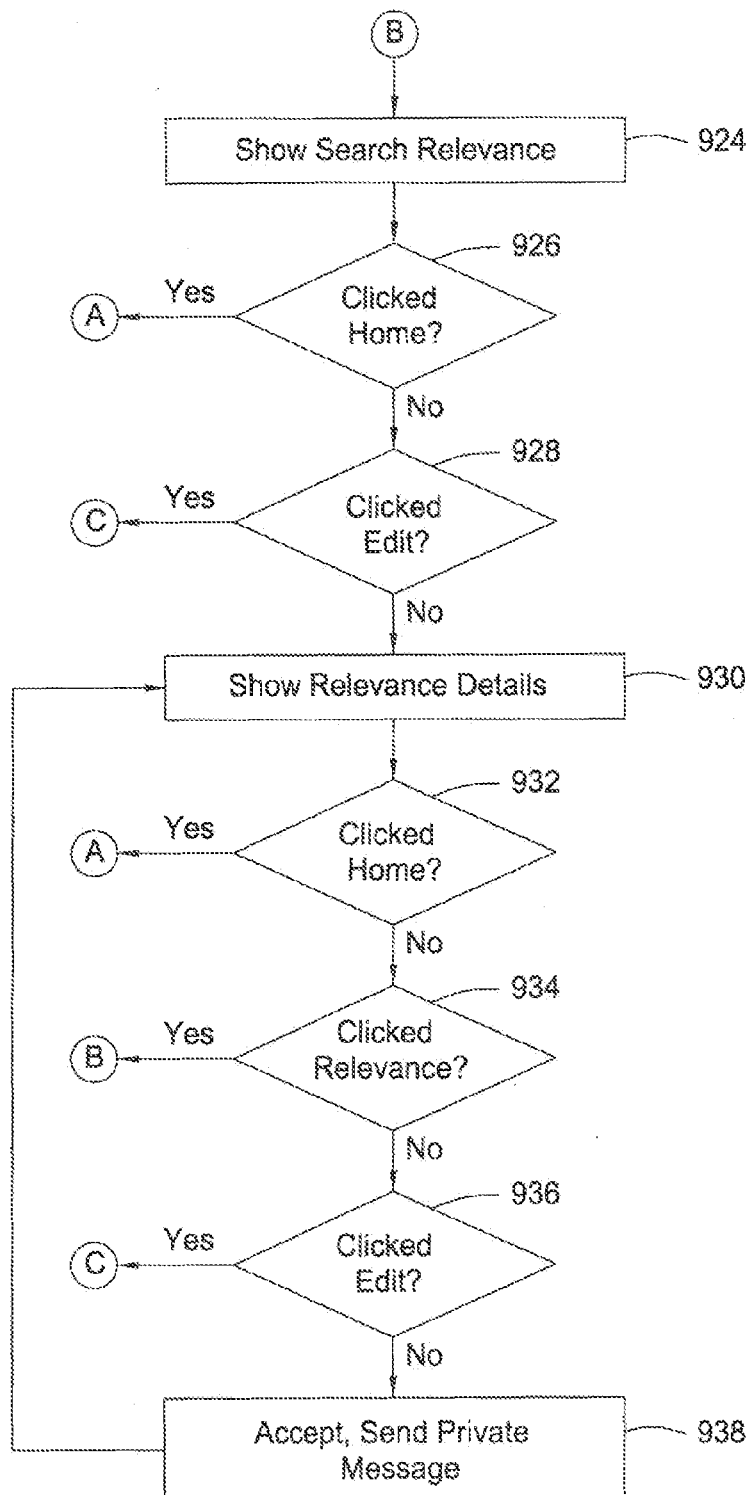

Referring now to FIGS. 8A, 8B and 8C, flow charts of a process flow in accordance with one embodiment of the present invention are shown. FIG. 8A shows the Registration/Sign In flow. FIG. 8B shows the initial flow once Registration or Sign In is complete. A Summary of each persistent search is shown. Clicking on a persistent search takes the user to FIG. 8C and shows the relevance for all search results. Other options include links for selecting a Category, starting a new search to Find Buyers or Find Sellers, changing user Preferences, getting Help, or Sign out. These links are common for most screens to facilitate easy movement throughout the Persistent Search Engine. As explained in FIG. 8B, when an existing search is selected in FIG. 11, or when a new search is created in FIG. 12 or FIG. 13, the process flow continues as shown in FIG. 8C. The user can review the Search Relevancy in summary, in detail, and can send the person associated with the search details. Alternatively, the user can return to the Search Summary or can edit the current persistent search.

The process begins at 900 and registration/sign in is performed in block 902. If the sign in is authenticated or the registration information is accepted in block 904, a search summary is shown in block 906. If a category is clicked, as determined in decision block 908, a seller edit flag is set in block 910 and a category is selected in block 912. If, however, a category is not clicked, as determined in decision block 908, and a new search is clicked, as determined in decision block 914, and a category is not selected, as determined in decision block 916, a category is selected in block 912. If however, a category is selected, as determined in decision block 916, or a category is selected in block 912, and a buyer search is selected, as determined in decision block 918, buyer search information is accepted in block 920. If, however, a seller search is selected, as determined in decision block 918, seller search information is accepted in block 922. If a new search is not selected, as determined in decision block 914, or the buyer search information is accepted in block 920, or the seller search information is accepted in block 922, search relevance is shown in block 924. Thereafter, if home is clicked, as determined in decision block 926, the process returns to block 906 where the search summary is shown. If edit is clicked, as determined in decision block 928, the process returns to decision block 918 where the type of search (buyer or seller) is determined. If home is not clicked, as determined in decision block 916, and edit is not clicked, as determined in decision block 918, the relevance details are shown in block 930. Thereafter, if home is clicked, as determined in decision block 932, the process returns to block 906 where the search summary is shown. If relevance is clicked, as determined in decision block 934, the process returns to block 924 where the search relevance is shown. If edit is clicked, as determined in decision block 936, the process returns to decision block 918 where the type of search (buyer or seller) is determined. If home is not clicked, as determined in decision block 932, and relevance is not clicked, as determined in decision block 934, and edit is not clicked, as determined in decision block 938, private messages can be accepted or sent in block 938. Thereafter, the process returns to block 930 where relevance details are shown.

Figure 9:
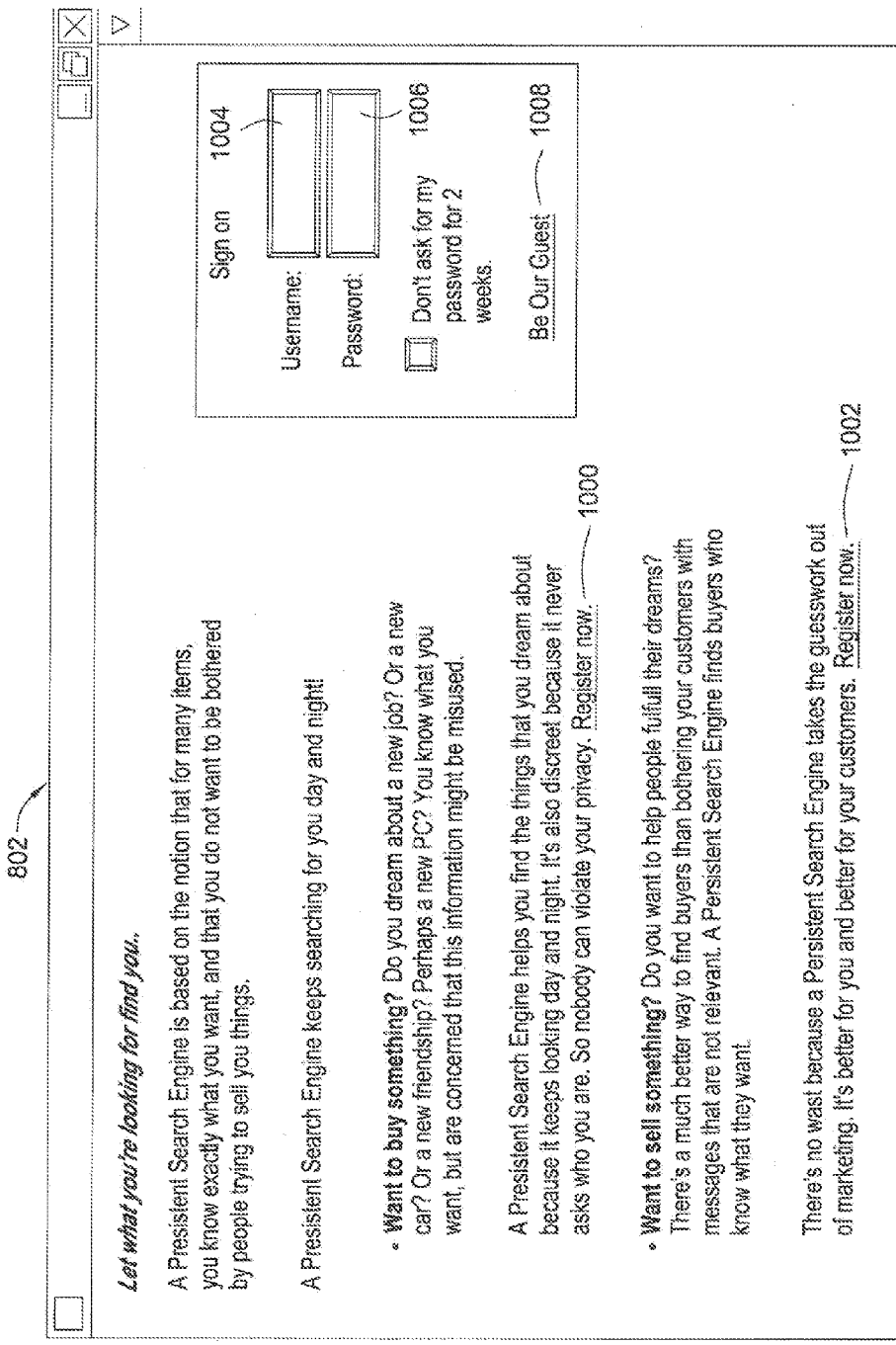
FIG. 9 shows a screen used to Register as a Buyer or Seller, or Sign In using a Username and Password in accordance with one embodiment of the present invention.

Now referring to FIG. 9, a screen 802 used to Register as a Buyer or Seller, or Sign In using a Username and Password in accordance with one embodiment of the present invention is shown. The user can register as a Buyer by clicking "Register Now" 1000 or as a Seller by clicking "Register Now" 1002. If the user has already registered, the user can Sign In by entering his/her Username 1004 and Password 1006. Other Sign In embodiments include biometrics, personalized encrypted identification devices, or other authentication methods. Guest access 1008 may permit an unregistered person limited access to the present invention, such as a search to find a Buyer of Seller without access to Relevance Details, Private Messaging, or making the search persistent.

Figure 10:
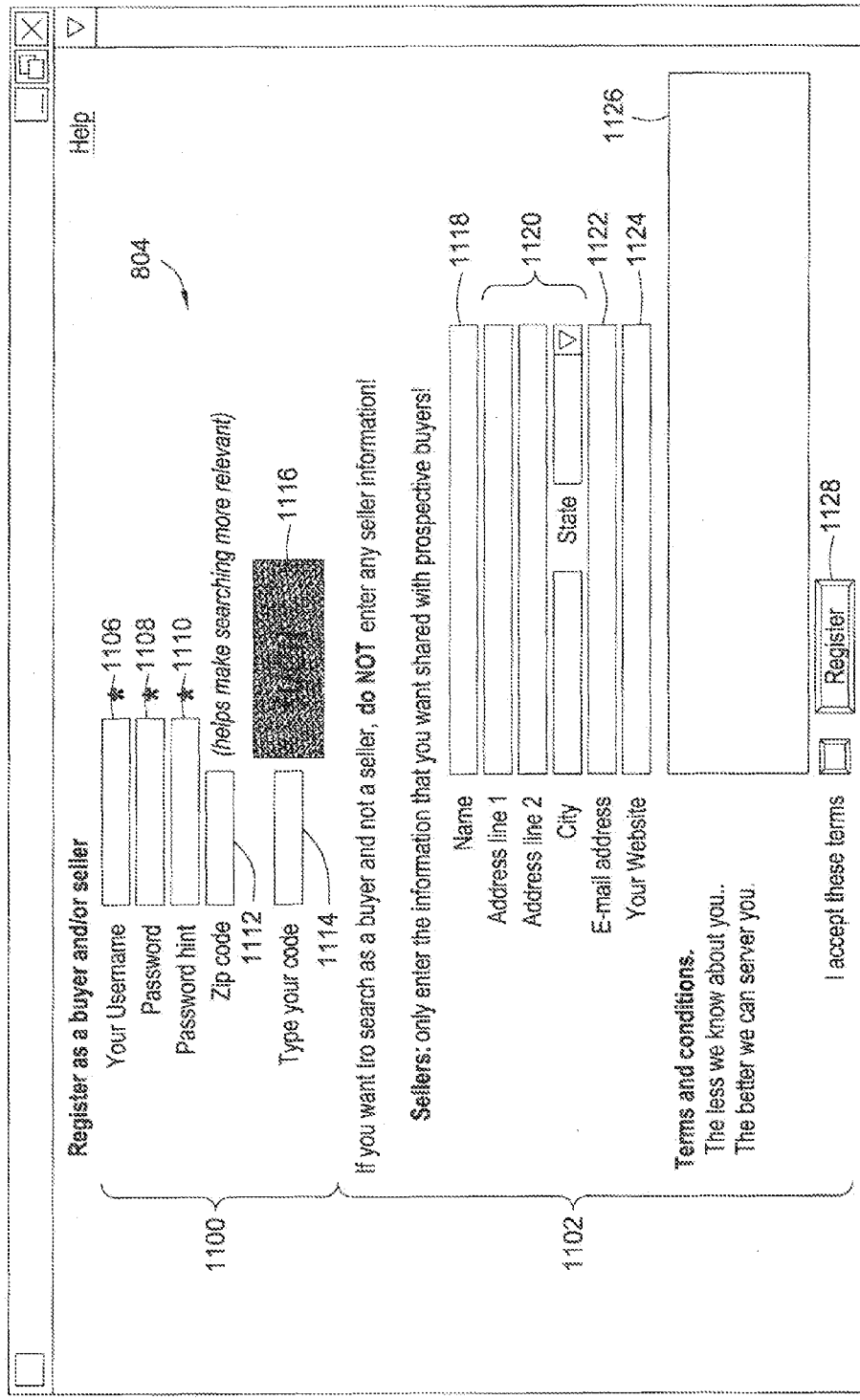
FIG. 10 shows a screen used to register both Buyers and Sellers in accordance with one embodiment of the present invention.

Referring to FIG. 10, a screen 804 used to register both Buyers and Sellers in accordance with one embodiment of the present invention is shown. The "dual search engine" nature of the present invention means that a Buyer can search for a Seller, any Seller can search for a Buyer, and any user can be both a Buyer and Seller at the same time. The Registration screen 804 accepts the information 1102 required to be a Buyer, which is intentionally minimal (e.g., Username 1106 (required), Password 1108 (required), Password hint 1110 (required), zip code 1112, code 1114 shown in block 1116, etc.). If the user wants to also be a Seller, he or she can optionally enter additional personal information 1104 (e.g., name 1118, address 1120, e-mail address 1122, website 1124, terms and conditions 1126, etc.). This is optional because for certain Categories, such as oil and gas brokering, both Buyer and Seller want to remain anonymous. Additional information could be entered but is not shown. Once the information is entered, the user clicks on Register 1128 to complete the process.

Figure 11:
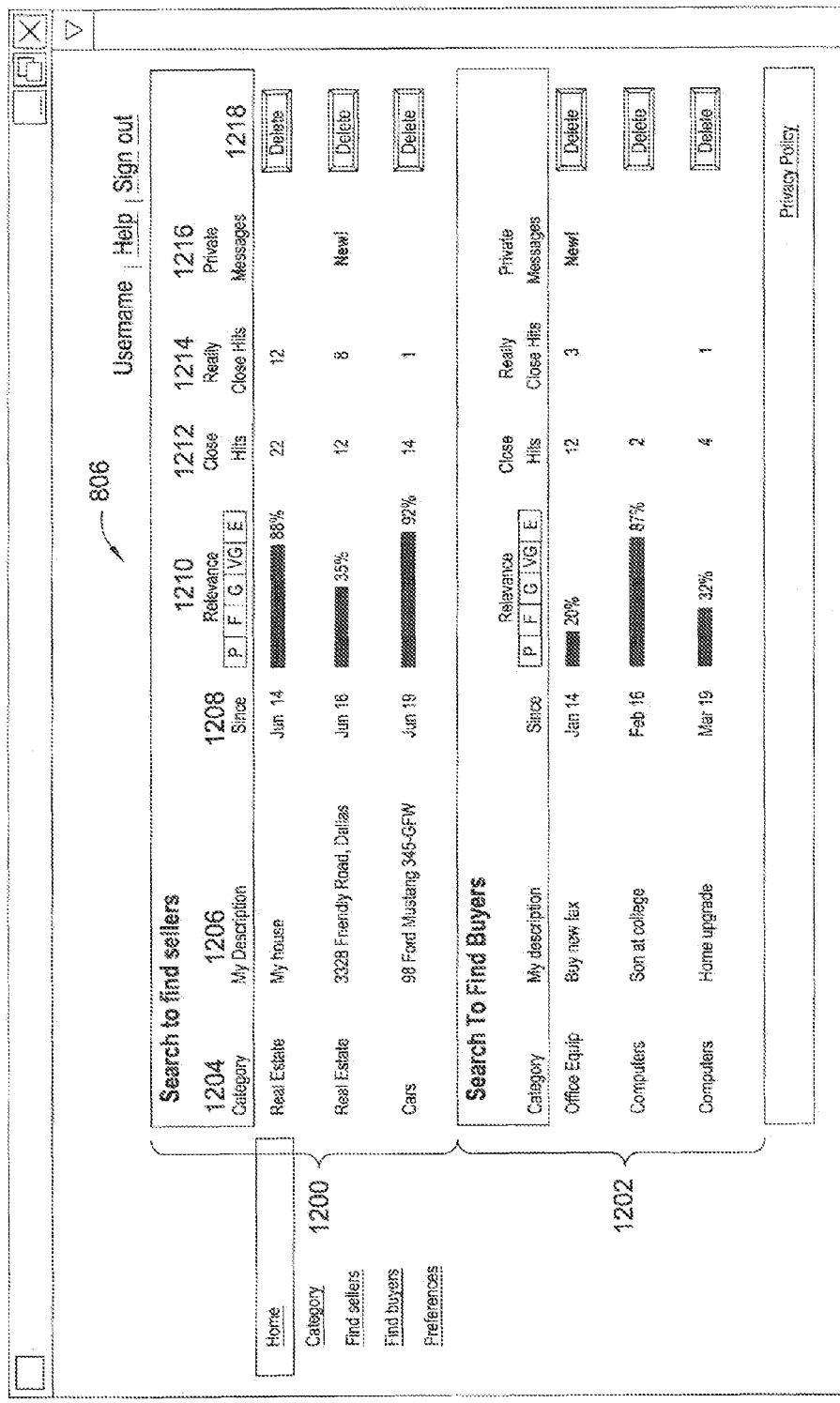
FIG. 11 is a screen showing an example of current persistent searches, along with a graphical relevance percent in accordance with one embodiment of the present invention.

Now referring to FIG. 11, a screen 806 showing an example of current persistent searches, along with a graphical relevance percent in accordance with one embodiment of the present invention is shown. Screen 806 lists current persistent searches, along with a graphical relevance percent for each search. There are two types of persistent searches shown: searches to find Sellers 1200 and searches to find Buyers 1202. Each persistent search result includes Category 1204, My Description 1206, Since 1208 (when the search was started), search result Relevance 1210, Close Hits 1212, Really Close Hits 1214, unread Private Messages 1216, and Delete button 1218. Relevance 1210 is the result of a calculation between what the Buyer and Seller are looking for and is discussed later. Relevance 1210 is displayed as a bar graph (poor, fair, good, very good and excellent) and a percentage. Close Hits 1212 is a counter is incremented for a search to find Sellers every time a Seller locates this search and sees it in Search Relevance 1210, and Really Close Hits 1214 is incremented every time a Seller sees it in Relevance Details 814. Likewise, Close Hits 1212 for a search to find Buyers is incremented every time a Buyer sees it in Search Relevance 1210, and Really Close Hits 1214 is incremented every time a Buyer sees it in Relevance Details 814.

Referring now to FIG. 12, a screen 1300 when a persistent search is Deleted (clicking on Delete button 1218 in FIG. 11) in accordance with one embodiment of the present invention is shown. It gives the user a chance to verify that the search needs to be Deleted by requiring the user to click on "Delete this search" 1302. It also gives the user a chance to Archive the search for later access by checking box 1304. It also permits the user to specify reasons why the search request is being deleted (e.g., the desired item was found through this search 1306, the desired item was found another way 1308, just wanted to stop the search 1310, etc.). This helps other users quantify if they lost a sale.

Figure 13:
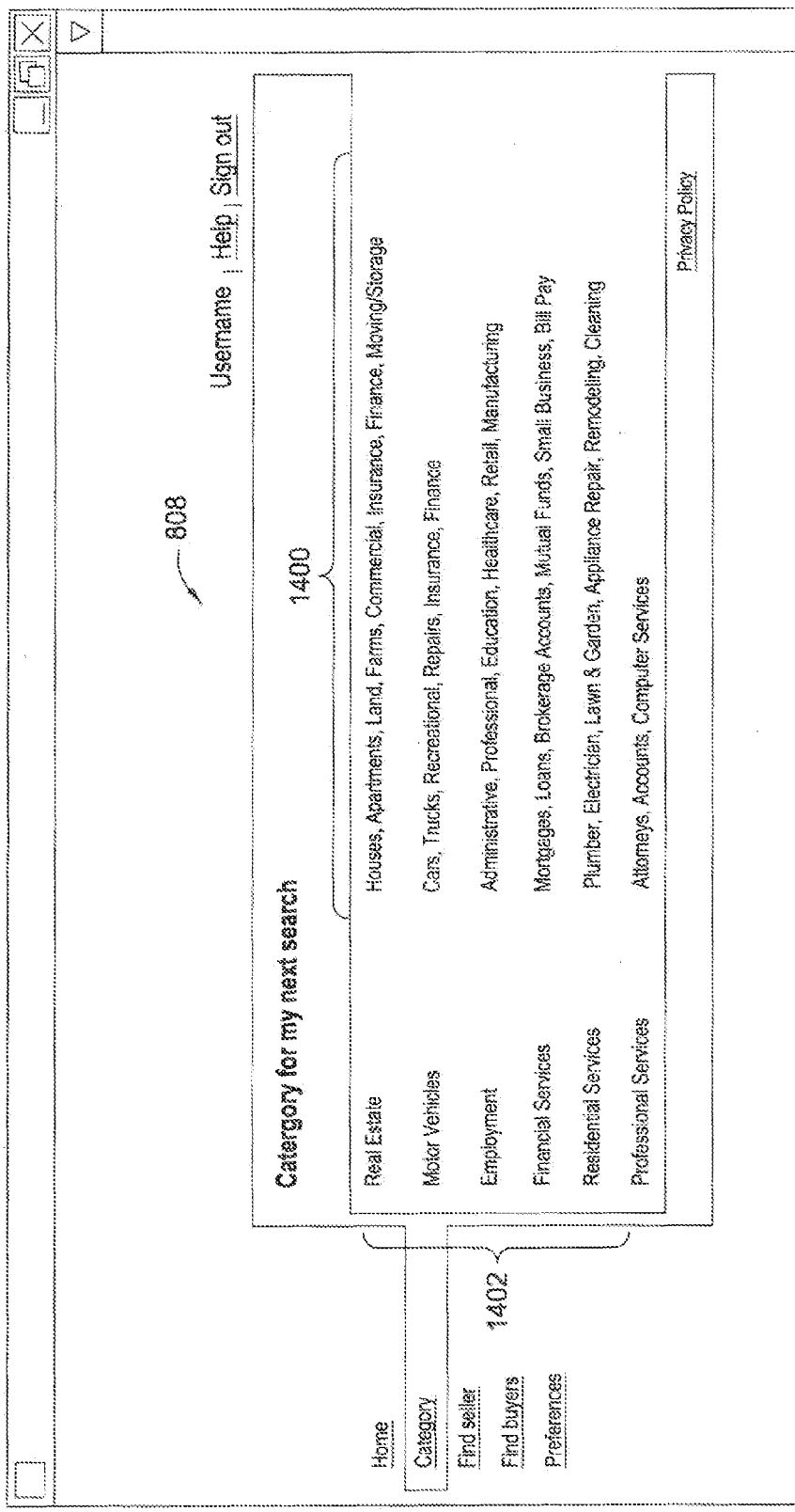
FIG. 13 is a screen listing the Categories grouped for easy review and selection in accordance with one embodiment of the present invention.

Now referring to FIG. 13, a screen 808 listing the Categories grouped for easy review and selection in accordance with one embodiment of the present invention is shown. When a Category 1400 is selected, it is made the current Category, is shown the top of each screen, and the corresponding Taxonomy is loaded for adding the next persistent search. The Categories 1400 are grouped into subject areas 1402 for easy review and selection. For example, the subject areas may include real estate, motor vehicles, employment, financial services, residential services, professional services, travel, vacation, computers, entertainment, dining, dating, hobbies, electronics, furniture, tools, home improvement, office supplies, household items, sporting goods, sporting events, recreation, event tickets, a combination thereof or any other desirable subject area. The Categories within the real estate subject area may include houses, apartments, land, farms, commercial, insurance, finance or moving/storage. The Categories within the motor vehicles subject area may include cars, trucks, recreational, repairs, insurance or finance. The Categories within employment may include administrative, professional, education, healthcare, retail or manufacturing. The Categories within financial services may include mortgages, loans, brokerage accounts, mutual funds, small business or bill pay. The Categories within residential services may include plumber, electrician, lawn & garden, appliance repair, remodeling or cleaning. The Categories within professional service may include attorneys, accountants or computer services.

Referring now to FIG. 14, a screen 810a used to create a new persistent search to find Sellers in accordance with one embodiment of the present invention is shown. As shown, Description 1500, Price From 1502, Price To 1504, Zip Start In 1506, Prefer Results Within 1508, Exclude Results Outside 1510, Comments 1512, and Urgency 1514 are all common fields. The fields in the middle are the Taxonomy Questions and Answers 1516. Note that Taxonomy answers can be Nice to Have 1518 and Must Have 1520 that are used to help calculate search result Relevancy. The present embodiment has drop-down boxes and the user may select one Answer for desired Questions, such as year built, and more than one Answer for other types of Questions, such as options available in a car. Answers to one Question may be dependant on Answers to other Questions. For example, a car Make of Ford configures the Answers to Model to the various Ford products, such as a Mustang. Other embodiments include selecting the requested attributes one or more check boxes, one or more radio buttons, one or more thumbnail pictures or videos, voice recognition, a fuzzy logic algorithm, a neural network, other types of presentation methods that may educate and guide the user and combinations thereof.

Note that the default Question name definitions can change from one Category to another. A car customer talks with a car dealer about price, whereas a job-seeker talks with an employer about salary. These are used to make the present invention friendlier and more relevant:

|  | Cars | Employment |
|---|---|---|
| Buyer | Customer | Job-seeker |
| Seller | Dealer | Employer |
| From/To value | Dollars | Salary |

Because Taxonomy definitions, Questions, and Answers are defined at run-time by the values stored for each Category, the same capability can be used to make Taxonomies work with different cultures and languages.

Figure 15:
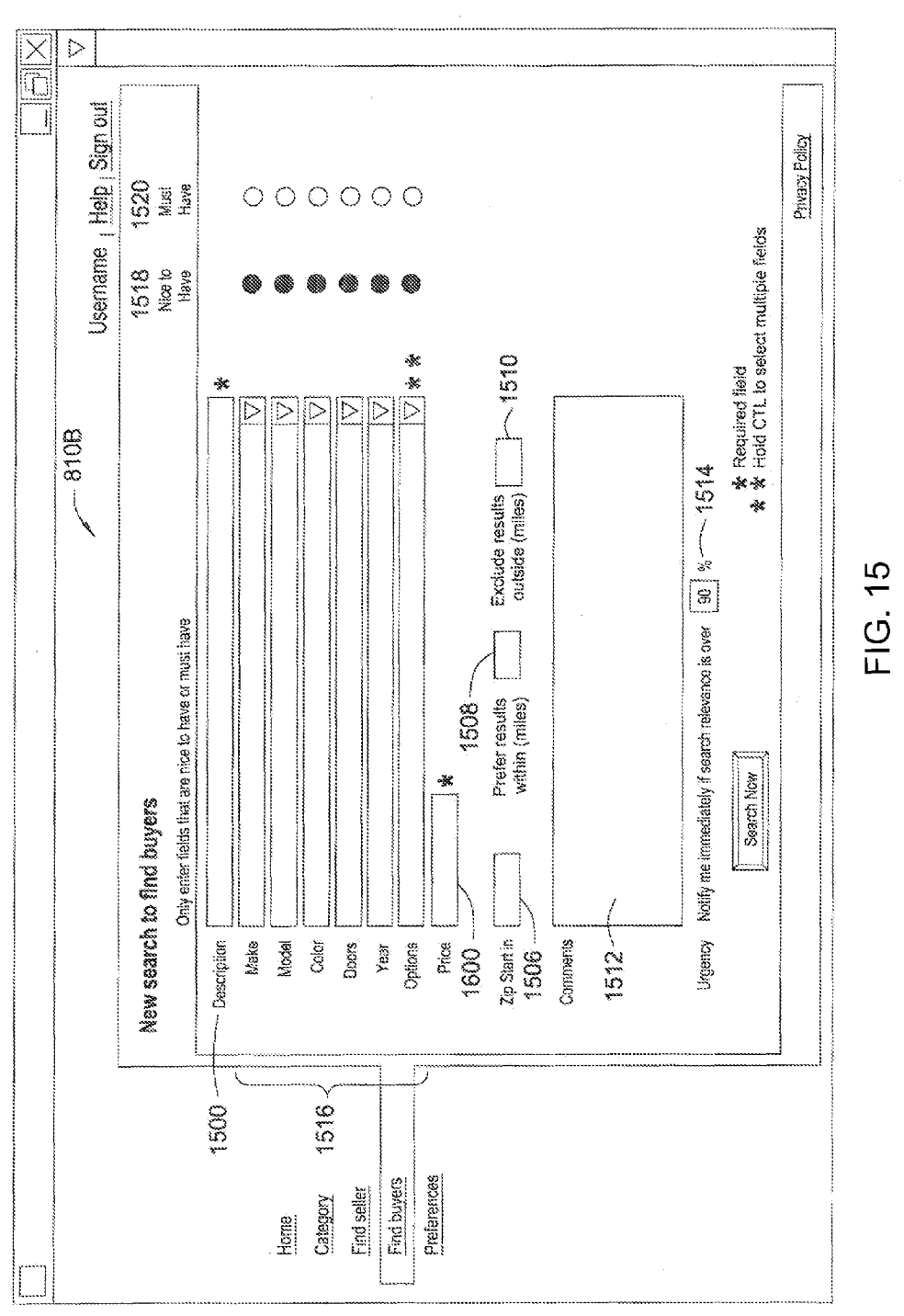

Now referring to FIG. 15, a screen 810b used to create a new persistent search to find Buyers in accordance with one embodiment of the present invention is shown. As shown, Description 1500, Price 1600, Zip Start In 1506, Prefer Results Within 1508, Exclude Results Outside 1510, Comments 1512, and Urgency 1514 are all common fields. The fields in the middle are the Taxonomy Questions and Answers 1516. Note that Taxonomy answers can be Nice to Have 1518 and Must Have 1520 that are used to help calculate search result Relevancy. The present embodiment has drop-down boxes and the user may select one Answer for desired Questions, such as year built, and more than one Answer for other types of Questions, such as options available in a car. Answers to one Question may be dependant on Answers to other Questions. For example, a car Make of Ford configures the Answers to Model to the various Ford products, such as a Mustang. Other embodiments include selecting the requested attributes one or more check boxes, one or more radio buttons, one or more thumbnail pictures or videos, voice recognition, a fuzzy logic algorithm, a neural network, other types of presentation methods that may educate and guide the user and combinations thereof.

Referring now to FIG. 16, a screen 812 showing the Persistent Search Engine results for a Buyer looking for Sellers in accordance with one embodiment of the present invention is shown. Note that this can also be for Sellers looking for Buyers, for Buyers looking for other Buyers, and for Sellers looking for other Sellers. For each Seller, the screen 812 displays a Description 1700, Since 1702 (when the search was started), Price 1704, search result Relevance 1706, Private Messages 1708, Times Replied 1710, and Delete button 1712. The Relevancy percent is based on the Taxonomy Questions and Answers, Nice to Have, Must Have, Price, location, keywords in the Comments, and other search criteria. If the user selects a search item, FIG. 17 appears next.

Figure 18:
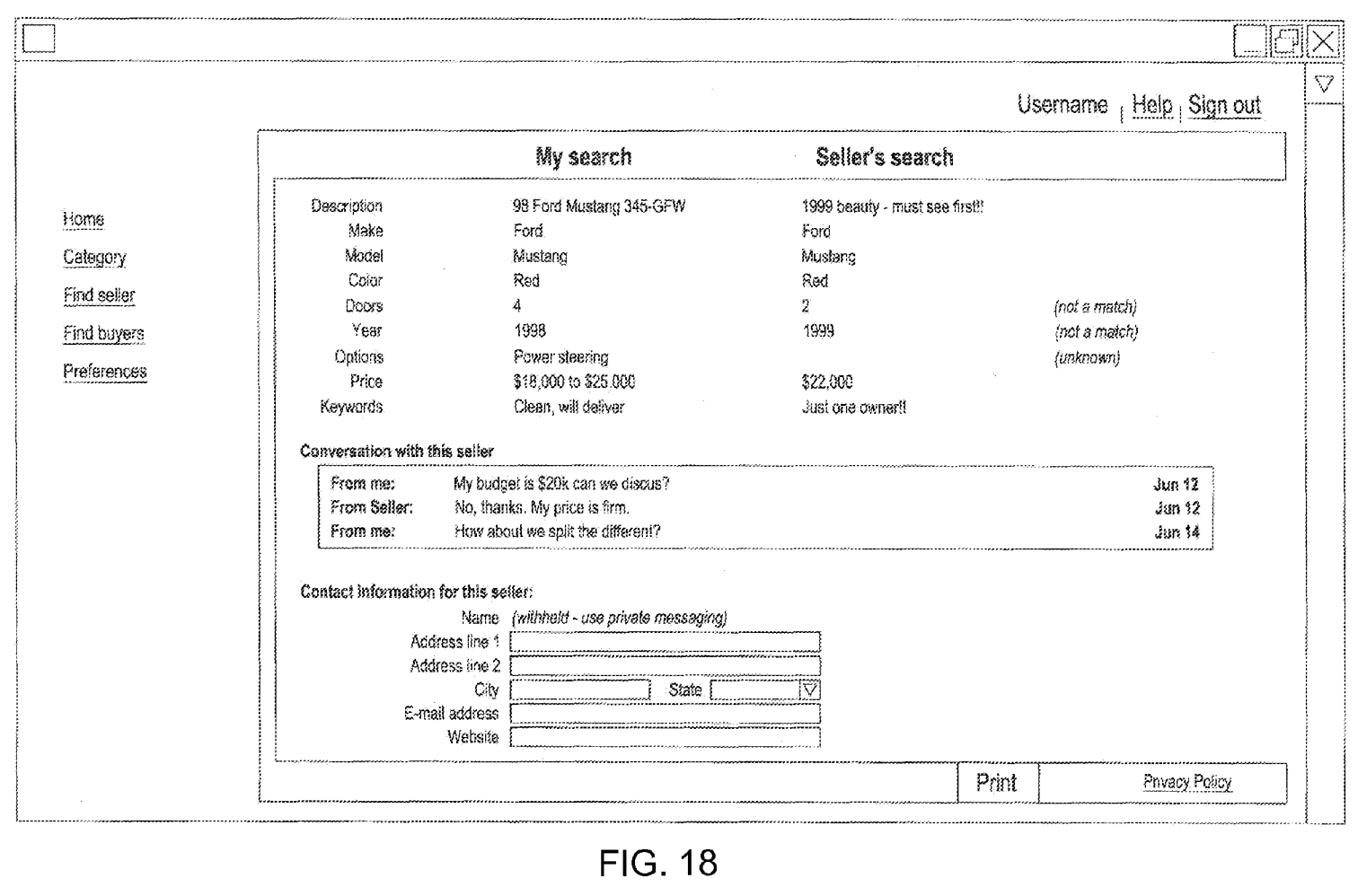

Now referring to FIG. 17, the Relevance Details screen 814 of the selected search item in accordance with one embodiment of the present invention is shown. This includes all Taxonomy Questions and Answers of both the Buyer 1800 and Seller 1802 and whether or not the attributes match 1804. Colors may be used to indicate Answers that matched or did not match that were used to calculate the Relevancy percent. From this screen, the user can more forward or backward in the search results to look at the Relevancy Details of the other search items in FIG. 16 without leaving the current screen (buttons 1806). This screen also has a list of private messages 1808 sent to and from the Seller, other party, as well as a place to enter a new message 1810 to send to this Seller. The number of remaining messages 1812 is shown so that the user is encouraged to send relevant information. If no more messages can be sent, then no message can be entered and a warning is shown. The user can also click on Never Show Again 1814 to permanently remove this search result from Search Relevance. The user may also select the Print button 1816 if a hardcopy of this screen is required. FIG. 18 is a printer-friendly format of FIG. 17 in accordance with one embodiment of the present invention. It is intended to be used as a permanent record of the search and messages. For example, it can be taken to a car dealer as proof of the terms and conditions agreed to between the Buyer and Seller.

Figure 19:
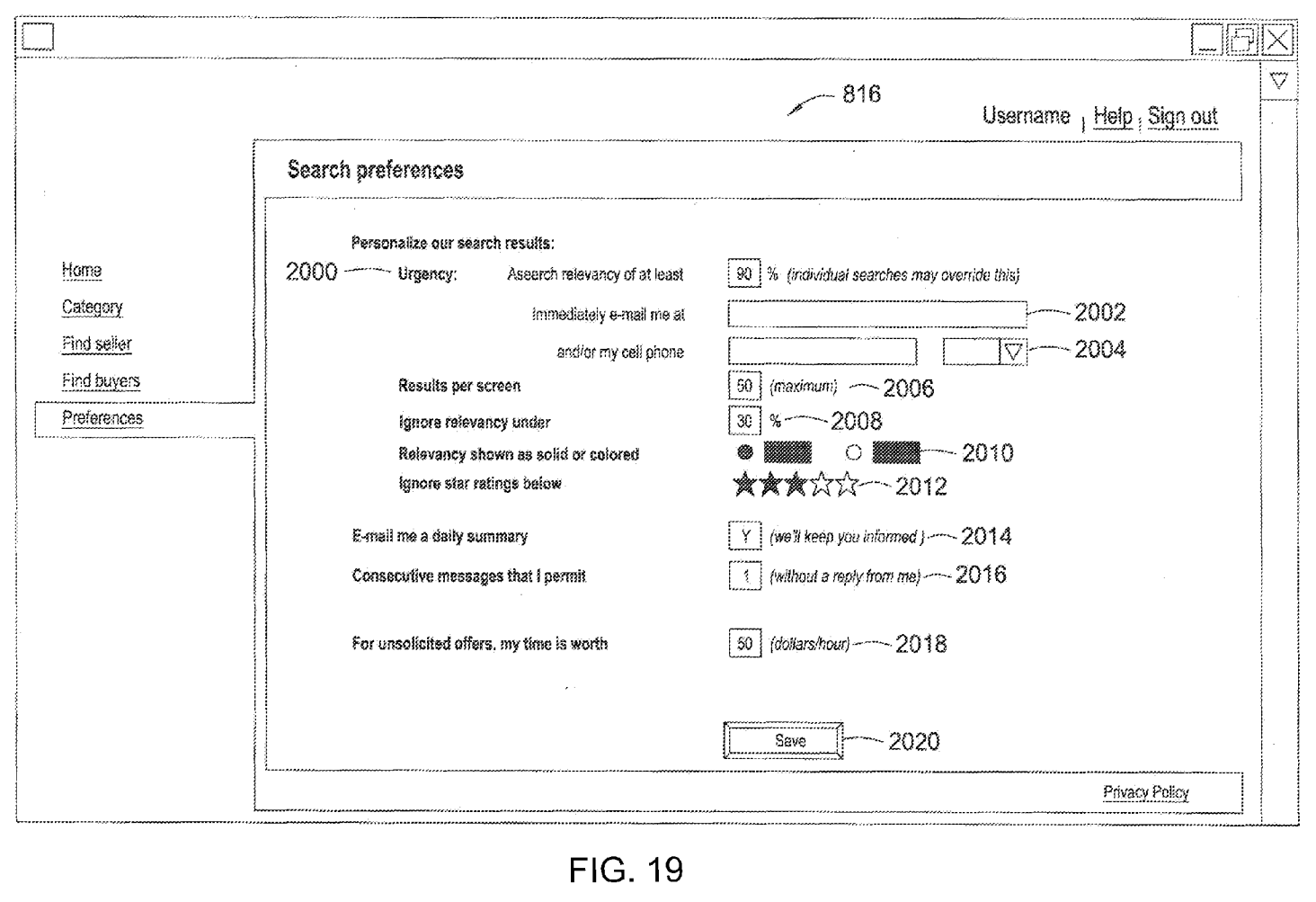

Referring now to FIG. 19, a screen 816 showing search preferences for the current user in accordance with one embodiment of the present invention is shown. The search preferences can be selected and changed at any time to personalize persistent search results. Urgency 2000 defines which persistent search results require special processing, and this processing can include being e-mailed 2002 and/or sent to the user's cell phone 2004. Note that this urgency definition 2000 can be overridden by any specific search. Other preferences include the number of Persistent Search Engine results 2006 to show on the Search Relevance screen, which search results are to be ignored 2008, how the graphic relevancy results are to be shown 2010, and how to filter out search results associated with Buyers and Sellers with low Star Ratings 2012. The user may also request that the Search Summary or other search result be e-mailed on a daily basis 2014. The user also indicates the number of consecutive messages that he or she will permit without replying 2016. This gives the user control over spam and other types of abuse. The user may also specify how much his or her time is worth per hour 2018 for Unsolicited Offers and Questionnaires. Preferences are one way that additional functionality is added to the present invention. The Preferences are saved by clicking on Save 2020.

Now referring to FIG. 20, a screen 820 showing a Privacy Policy in accordance with one embodiment of the present invention is shown. Note that the emphasis is on not collecting personal information. FIG. 21 shows the Privacy Policy in more detail.

Figure 22:
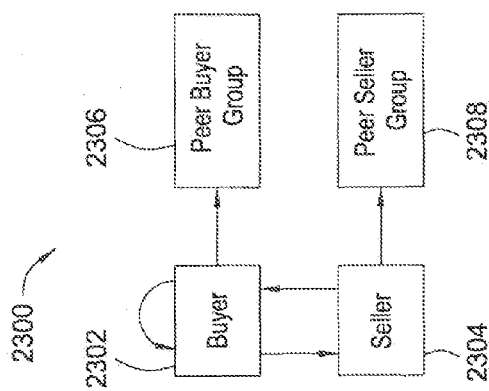
FIG. 22 is a block diagram showing another way that information flows to and from Buyers and Sellers in accordance with one embodiment of the present invention.

Referring now to FIG. 22, a block diagram 2300 showing another way that information flows to and from Buyers 2302 and Sellers 2304 in accordance with one embodiment of the present invention is shown. A persistent search by a Buyer 2302 to find Sellers 2304 is a primary process. A persistent search for a Seller 2304 to find a Buyer 2302 is unique and a powerful new tool for eCommerce. In addition, a persistent search by Buyers 2302 to find and monitor similar Buyers 2306 provides important information that helps Buyers 2302 make more informed decisions. For example, if there are many other Buyers 1306 looking for the same product, a Buyer 2302 knows that their bargaining position is weakened and he or she must act accordingly. If there are few other Buyers 2306 looking, then a Buyer 2302 knows that their stronger bargaining position. The same is true for Sellers 2304. If there are many Sellers 2308 offering the same product, the Seller 2304 knows that their bargaining position is weak and they can withdraw the sale or enter negotiations properly prepared. If there are few other Sellers 2308, then a Seller 2304 is in a much stronger position. Applied to online auctions, it is possible for a Seller 2304 to locate a Buyer 2302 for a good selling price without the need to have an auction and await the outcome.

Now referring to FIG. 23, a flow chart 2400 showing one method to calculate the relative importance of any question and Answer pair in accordance with one embodiment of the present invention is shown. The Persistent Search Engine does not permit manipulation of any search results because they are calculated entirely based on how well the Taxonomy Answers of a search match the existing Answers of existing searches. The only way a Seller, for example, can improve its placement with Buyers is to use the many tools provided by the present invention to meet the unfulfilled demand of Buyers. Buyers or Sellers who provide false Answers to Questions receive lower Five Star Ratings and are quickly filtered out of search results.

The method 2400 for determining the relative importance of any Question and Answer pair (attribute) is repeated for each question in the Taxonomy in the search Category. The present embodiment ignores unspecified attributes in the scoring by excluding them from the average. This is done to focus on Questions that have been answered. If attributes match and are Must Have, the score for this Answer is 100. If they match and are Nice to Have, the score is 95. If they do not match and are Must Have, the score is 0, otherwise 25 for Nice to Have. The attribute scores are then average determine Relevancy percent. Partial match scoring would be possible by limiting the specific attributes under consideration. For example looking for a car and financing could be included in the same search, but provided by different Sellers. Since a bank isn't in the business of selling cars this would necessitate the ability to ignore the attributes which are specific to car selection.

More specifically, if the Answer is blank, as determined in decision block 2402, 100 is added to the current sum in block 2404. If, however, the Answer is not blank, as determined in decision block 2402 and the Answers are the same, as determined in decision block 2406, and the Answer is Must Have, as determined in decision block 2408, 100 is added to the current sum in block 2410. If, however, the Answer is not Must Have, as determined in decision block 2408, 95 is added to the current sum in block 2412. If, however, the Answers are not the same, as determined in decision block 2406, and the Answer is Must Have, as determined in decision block 2114, 0 is added to the current sum in block 2416. If, however, the Answer is not Must Have, as determined in decision block 2114, 25 is added to the current sum in block 2418. If there is not another Answer, as determined in decision block 2420, after the proper amount has been added to the current sum in block 2404, 2410, 2412, 2416 or 2418, the Relevance is calculated in block 2422. If, however, there is another Answer, as determined in decision block 2420, the process loops back to decision block 2402 and continues as previously described until all Answers evaluated.

Figure 24:
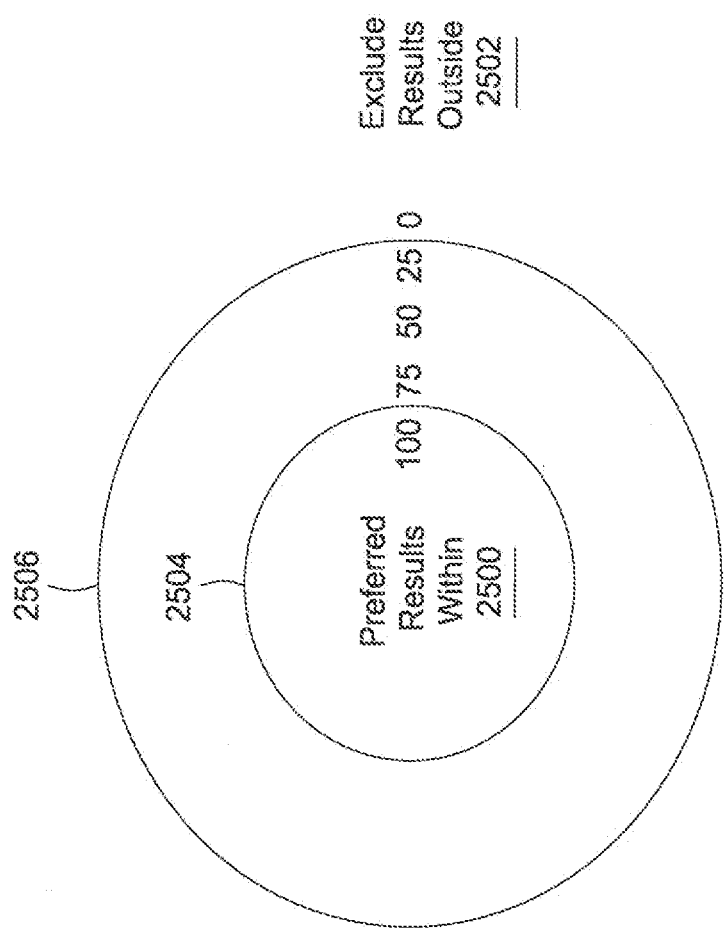
FIG. 24 is a diagram illustrating a relevancy score calculation based on distance in accordance with one embodiment of the present invention.

In another embodiment, a third modifier to an attribute could be used for search elimination. "Absolute attributes" would eliminate a search from consideration if that attribute's score is 0. A modification to this scoring method is useful for adding a proximity filter to the scores, as shown in FIGS. 14 and 15. The Zip Code of the Buyer search and Seller search are used to calculate the Distance between the two points. This is then used with FIG. 24 to calculate the score. The radius of the inner circle 2504 is from Prefer Results Within 2500 and is given a score of 100. The radius of the outer circle 2506 is from Exclude Results Outside 2502 and Distances that exceed this are given a score of 0. The score between the two circles is calculated from 100 to 0 depending on the Distance from the center. The rules for calculating can be stored in Preferences for this user or Category. Another example could be cars that do not have the color of red are to be eliminated from the results, and not just scored with a lower Relevance.

In another embodiment, Distance could be the major search factor. For example, a search for a car would exclude cars outside Exclude Results Outside, irrespective of the other Relevancy calculations. In another embodiment, the Zip Code of the Buyer and Seller are dynamically updated based on the location of, for example, a person's cell phone. A Buyer could, for example, be driving and be notified by the Event Manager by cell phone if he or she drives within Preferred Radius Within of a desired item. In another embodiment, a seven digit Zip Code can be used for more accurate Distance Calculations.

Figure 25:
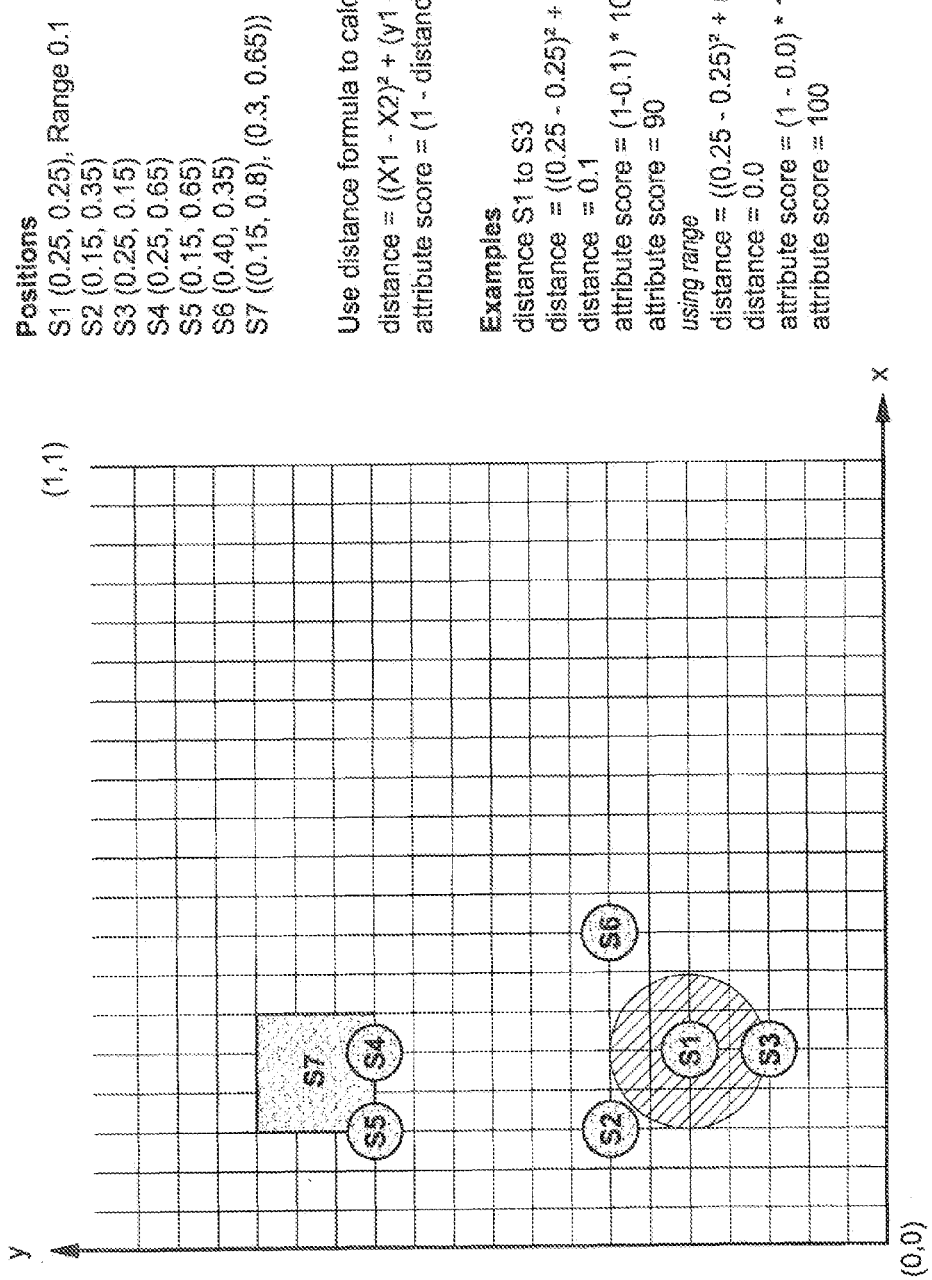
FIG. 25 illustrates the use of geometric distance calculation to score a search in accordance with one embodiment of the present invention.

Another embodiment would be to use a geometric distance calculation to score a search. The attributes are given coordinates on a graph (Cartesian, radial, or otherwise) with n-dimensions, the furthest any attribute value can be away from other attribute values is 0.999999 (effectively 1) on a given axis, as shown in FIG. 25 as a 2-dimensional Cartesian example. This means that taking the (1−attribute distance) *100 will calculate the Relevance percent. This also allows for other geometric plots to be use to represent different attribute types, such as ranges. Attributes could be plotted by hand, using the current population, using a predefined function, or any combination. Absolute Attributes could be also added as a score multiplier. Partial match scoring would be possible by limiting the number of dimensions under consideration.

Figure 26:
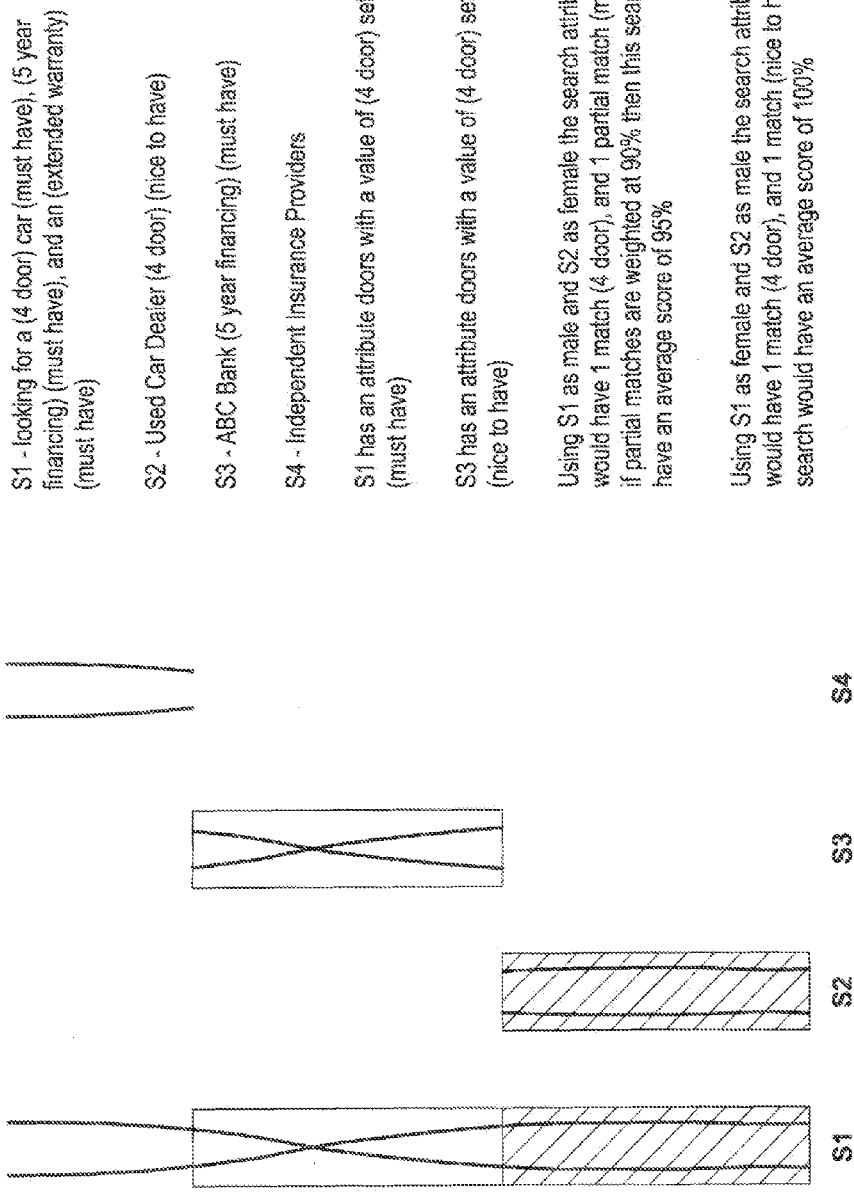
FIG. 26 illustrates the use of a genetic calculation to score a search in accordance with one embodiment of the present invention.

In another embodiment, fields are matched based upon a gene compatibility (see FIG. 26). A universally compatible gene would be used to represent a "not specified" attribute. Must Have and Nice to Have would be represented by a gene factor which would affect compatibility. Scoring could be based upon a male focused (the search being matched, the current users search) missed gene factor average, a weighted miss hit ratio as in Attribute Scoring, or a combination thereof. Absolute Attributes could be also added as a score multiplier. Partial match scoring would be possible by limiting the number of genes under consideration. In another embodiment, Relevance calculation scores can be stored in Preferences or Categories for this user. This permits any user more granular control over his or her search Relevancy calculations.

Figure 27:
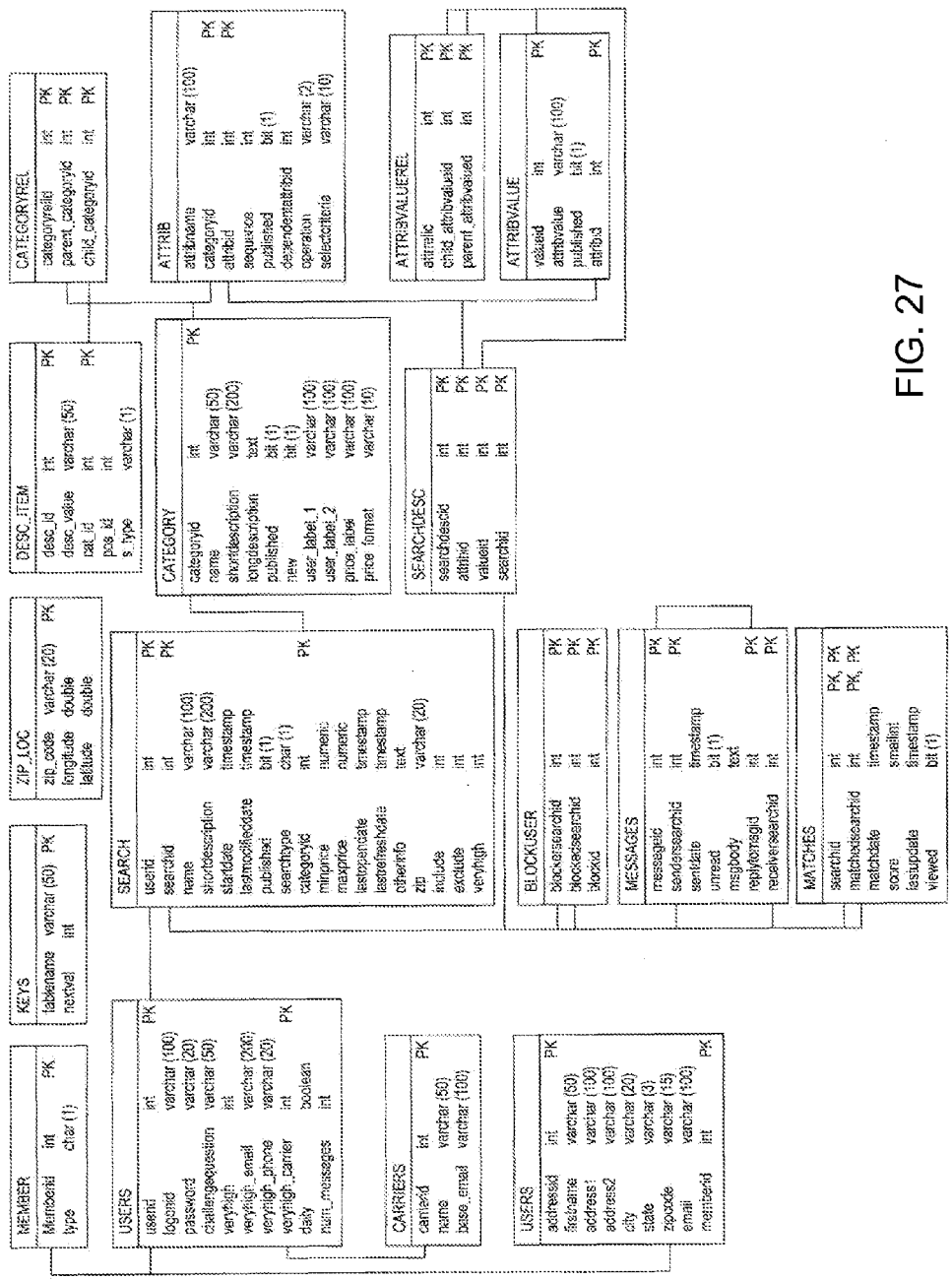
FIG. 27 is a database design in accordance with one embodiment of the present invention.

The database design of one embodiment of the present invention is shown in FIG. 27. In the searching process, fields are matched based upon matches searchdesc.attribid and searchdesc.valueid. Note that valueid would be sufficient because in the current embodiment, every value has a unique id.

Counters ("Five Star Ratings") are kept on all Buyer and Seller activities. This includes permitting Buyers to rate Sellers. The percent of satisfied Buyers that a Seller has helps other Buyers decide if they should trust the Seller. A global filter in Preferences can be adjusted in any specific search by having a Taxonomy Question and corresponding Answers so that Sellers below a Buyer-defined threshold may be eliminated from the search results. In the same manner, a Buyer that acts inappropriately, such as abusing the Unsolicited Offers and Questionnaires revenue model, can be filtered out of Sellers searches to find Buyers. This effectively eliminates Buyers that commit "click fraud", a significant problem with current keyword-driven search technologies.

The present invention also provides various new revenue models. Current keyword search engine technologies must accept a command, search the content of billions of Web pages stored in Data Storage, prioritize the results, and display them in a less than one second. A "persistent" search can last for minutes, hours, days, or even months. This enables several unique revenue models because both Buyers and Sellers can learn much more over time. In the preferred embodiment, the following revenue models are typical:

1. Subscription fees can be charged to Sellers and, for some Categories, Buyers for basic access to the Persistent Search Engine. The unique nature of a search engine to find Buyers enables this most basic revenue model.
2. Buyer Leads because each persistent Buyer search is really a lead that contains what product or service features are important. Higher click through rates are enabled because of assured privacy, assured relevance, convenience, and personalization possibilities. Higher revenue per lead is enabled because some of the Categories are for major ticket items, such as cars. Revenue per lead can be a flat amount or tied to the value of the item. For example, a lead for a used Camry might be worth $20 whereas a for a new Lexus might be worth $100.
3. Priority Leads permits a Seller's persistent search to be notified quickly when a new search result is found. This could be by priority E-mail, Cell Phone, Private Messaging, RSS feed, XML connection, as shown in FIG. 19. For example a car lead with a high Relevance percent could be sold for $100 if immediately forwarded by the Event Manager, and $50 for regular processing that might have a 4 hour delay.
4. Broadcast Buyer Leads to Sellers that may or may not be using the Persistent Search Engine. For example, a Buyer search for a certain car would be broadcast to all car dealers in a certain trade area. If the car dealer uses the Persistent Search Engine, a link could take the dealer directly to the Relevance Details screen. If the car dealer does not use the Persistent Search Engine, details of the Persistent Search Engine can be included in the lead. These Broadcast Buyer Leads represent "lost sales" reports for all recipients of the broadcast if they do not act upon these leads.
5. Peer Group Marketing Intelligence fees for Buyers searching for similar Buyers and Sellers searching for similar Sellers. For example, a person selling their home would gain valuable marketing intelligence knowing what other similar homes are on the market. In addition, a person buying a home would gain valuable marketing intelligence knowing how many other people are trying to buy a similar home. Knowledge is power, and these tools represent another revenue model for the Persistent Search Engine.
6. Changes to Persistent Searches, such a price change or a search being terminated. For example, a change to the price of a home being offered by a Seller can notify Buyers looking for similar homes, as well as Sellers selling similar homes. A fee can be charged for this information.
7. Quantifying the Level of Interest that a Buyer or Sellers has. This behavior can be measured with a combination of Persistent Search Engine information, including Close Hits, Really Close Hits, the number of times a person looked at a search result, and the time they have spent looking at a search result. The present invention provides value even when a search is not completed, and a fee can be charged for this information.
8. Unsolicited Offer and Questionnaire fees permit Sellers to contact Buyers with products or services that are not Relevant. The Persistent Search Engine protects Buyers by only returning Relevant offers, and Sellers that abuse this can be eliminated from search results by unfavorable Five Star Ratings. However, there needs to be a way to for Sellers to educate Buyers about products and services that they may be unaware of The Persistent Search Engine permits this by giving Buyers the option to specify how much their time is worth and then have Sellers buy this time so that unsolicited offers may be considered and then commented on. For example, a Buyer may be searching for a Ford product. Chrysler could offer to purchase 10 minutes of the Buyer's time for $10 so that Chrysler can educate the Buyer of a competitive product. Payment could be by check, airline points, gift certificates, or any other method that does not violate the privacy of the Buyer. This represents a highly cost-efficient way that, for example, can Chrysler educate a Buyer just before the purchase of a competitive product. At worst, Chrysler gets is answers to question about why a competitive product is being purchased, something that is currently very difficult to capture. At best, Chrysler salvages a sale. This represents the cheapest way to find the most valuable person—a real buyer just before he or she is lost to a competitor. This is a true breakthrough for reducing customer acquisition costs. Included is a modeling tool to ensure the most efficient use of promotion budgets.
9. Messaging fees can be charged to the Seller and possibly Buyer. This enables, for example, leads to be broadcast with detailed information to any party and only charging that party if they act upon a broadcast lead by sending a Message.
10. Quantified Lost Sales can be sold in real time to educate Sellers, both those that bought a lead and those just observing Buyer Behavior. In the brick-and-mortar world, up to 80% of sales are never completed. With eCommerce, these numbers can be far greater, and quantifying this is very difficult. For example, a Buyer Lead may be purchased by three Sellers. When the search terminates, the Buyer is given the opportunity to explain why. If the reason is the product or service was purchased from one of the Sellers, the other two have, be definition, lost the sale. Using the Persistent Search Engine to quantify this in real time and permit Sellers to make adjustments accordingly creates new, unique ways to position products and services. When combined with Unsolicited Offers and Questionnaires, Sellers have the opportunity to, for example, get the Buyer's business for servicing a car even though the sale was lost to a competitor. A service relationship increases the chances of a car sale to this Buyer next time. Of course, this same information can be sold to other firms just looking for new service customers.
11. "RSS" Buyer Data can be sold for a fee in real time as a new type of marketing RSS news feed. Accurate marketing data is becoming more and more expensive and always has a confidence factor. Marketing intelligence on real Buyers looking for real products and services has the opportunity to revolutionize market research.
12. "Replay the Tape" Simulations. eCommerce can be thought of as a continuous stream of Buyer and Seller interaction that can be logged. This can be sold and then be replayed with different product and service features to simulate what might have happened under different circumstances. In this example, new or even non-existent product or service variations can be tested against real Buyer unfulfilled demand scenarios.
13. Research Questionnaires can be sent to Buyers showing certain purchase intent or characteristics. Assured privacy and the capability to search for real Buyers greatly increases the quality of Questionnaire recipients and the value of the resulting Research. Participating Buyers can be paid in the same manner as for Unsolicited Offers.

14. Brokerage Fees may be charged based on the value of a successful sale.
15. Cell Phone Notification fees may be charged to Sellers or Buyers.
16. XML Linkage fees can be charged for using the Persistent Search Engine to add a "persistence layer" to an existing brand.
17. Unfulfilled Demand Statistics can be automatically tabulated and offered for sale. Some of these could be for product or services that do not yet exist. For example, Buyers could have searched for a Camry with side airbags years before it was offered. These raw, unfulfilled demand statistics are potentially valuable for both car manufacturer planners as well as car dealers selling competitive products.

Examples of how revenue models may be combined:

For aggressive Seller adoption: Broadcast Buyer Leads can be sent in a daily e-mail for free letting, say, car dealers review them. The dealer would then be charged the full amount of the Buyer Lead when the first Message is sent to a Buyer. The Seller's account could be credited with $100 to offset the cost of initial leads.

More typical: a base Subscription fee can be charged to Sellers, along with a charge for each Buyer Lead, a charge for each Quantified Lost Sales, and a premium charge for salvaging potentially lost business with Unsolicited Offers and Questionnaires.

It should be noted that these revenue models are driven by what a Buyer wants and not his or her identity, where they live, their race, or any other personal information. The design of the Persistent Search Engine protects Buyer and, if necessary, Seller identities by never requiring personal information to be entered.

Figure 28:
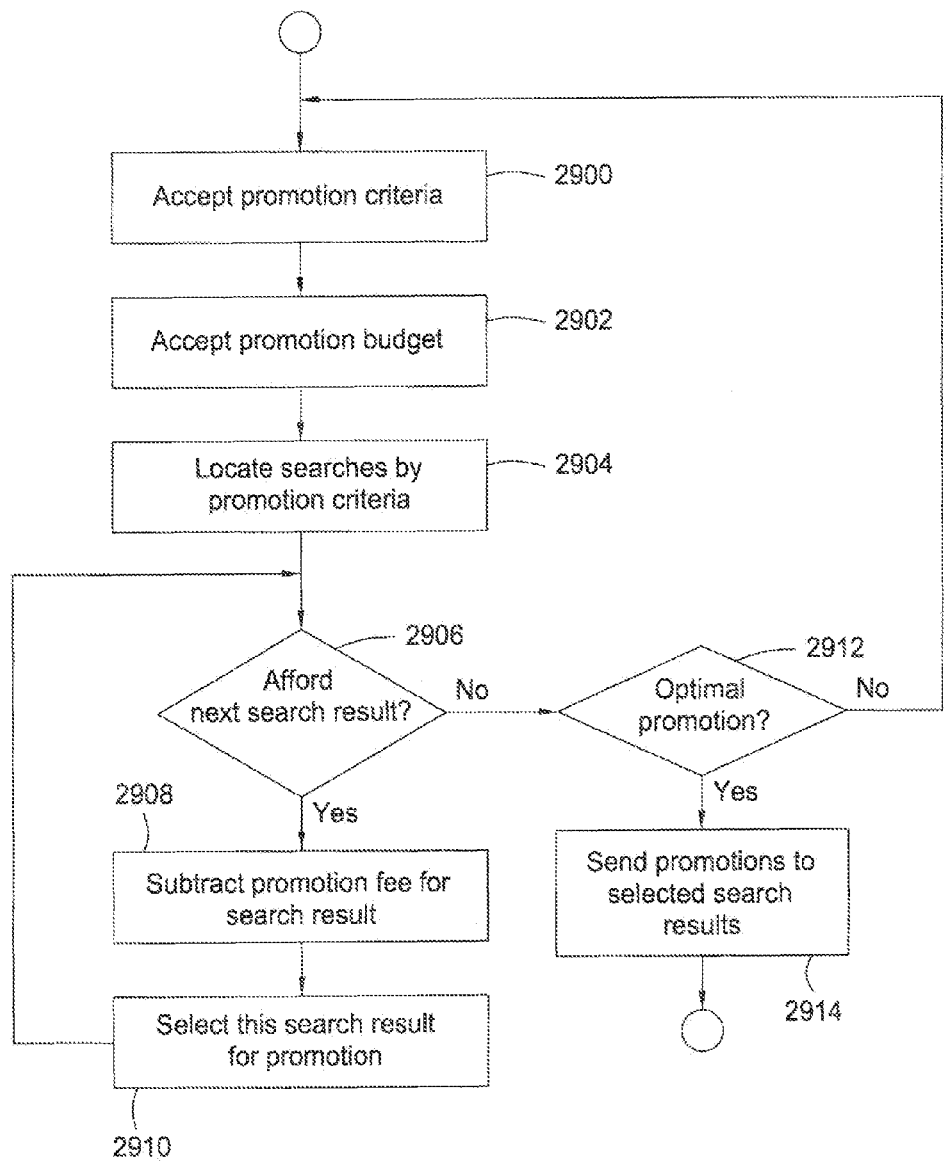
FIG. 28 is a modeling tool that accepts a promotion criteria and budget for unsolicited offers (revenue model #8) in accordance with one embodiment of the present invention.

Referring now to FIG. 28, a modeling tool that accepts a promotion criteria and budget for unsolicited offers (revenue model #8) is shown. It then accesses high-propensity buyers for the most efficient use of promotion budget. This is a combination of search relevance and the value of the buyer's time. For example, the promotion can reach twice as many people who want $10 than those who want $20 for the time required to review the offer. This process repeats until the promotional budget is used. Different criteria and budgets can be entered until the optimal use of the funds is determined, and them the promotion is executed.

More specifically, promotion criteria are accepted in block 2900, a promotion budget is accepted in block 2902 and searches are located by promotion criteria in block 2904. If the promotion budget can afford the next search result, as determined in decision block 2906, the promotion fee for the search result is subtracted in block 2908, the search result is selected for the promotion in block 2910 and the process loops back to decision block 2906 to check the next search result. If, however, the promotion budget cannot afford the next search result, as determined in decision block 2906, and the promotion is not optimal, as determined in decision block 2912, the process loops back to block 2900 where new promotion criteria are accepted. If, however, the promotion is optimal, as determined in decision block 2912, the promotions are sent to the selected search results in block 2914.

Figure 29:
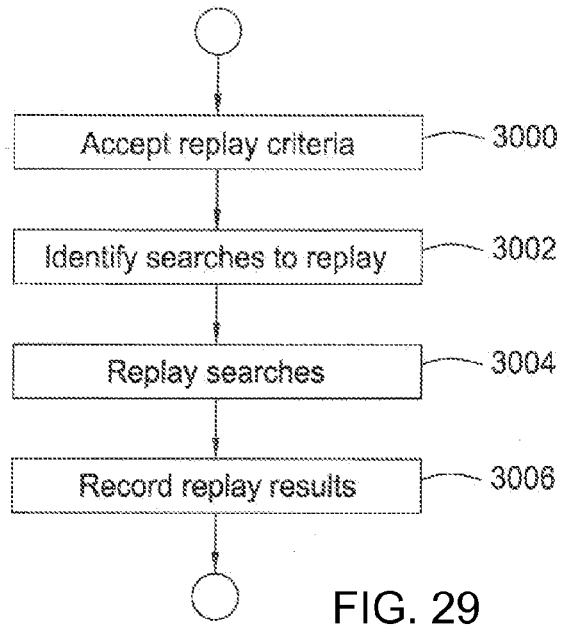
FIG. 29 is a flow chart illustrating accepting a replay criteria (search and time period) and then "replaying the tape" of buyer searches against seller searches to find buyers, the latter of which can be modified to simulate different results in accordance with one embodiment of the present invention.

Now referring to FIG. 29, a flow chart for accepting a replay criteria (search and time period) and then "replaying the tape" of buyer searches against seller searches to find buyers, the latter of which can be modified to simulate different results is shown. The process begins by accepting replay criteria in block 3000. Thereafter, searches are identified for replay in block 3002, the searches are replayed in block 3004 and the replay results are recorded in block 3006.

Figure 30:
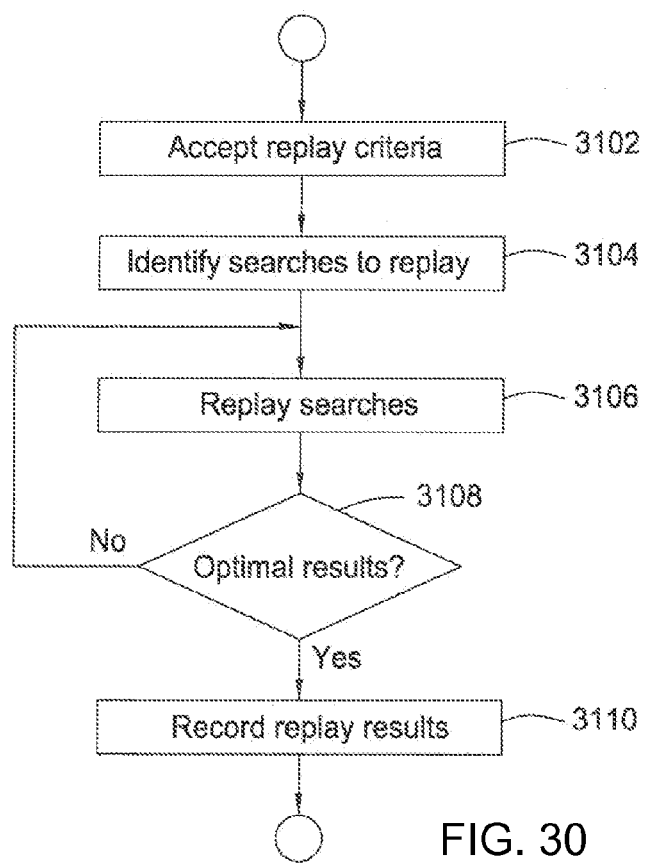
FIG. 30 is a flow chart illustrating a simulation to repeat looking for optimal or pre-stated results.

Referring now to FIG. 30, a flow chart that permits the simulation to repeat looking for optimal or pre-stated results is shown. The process begins by accepting replay criteria in block 3102. Thereafter, searches are identified for replay in block 3004 and the searches are replayed in block 3006. If the replay results are not optimal, as determined in decision block 3108, the process loops back to block 3106 where the searches are replayed. If, however, the replay results are optimal, as determined in decision block 3108, the replay results are recorded in block 3110.

Figure 31:
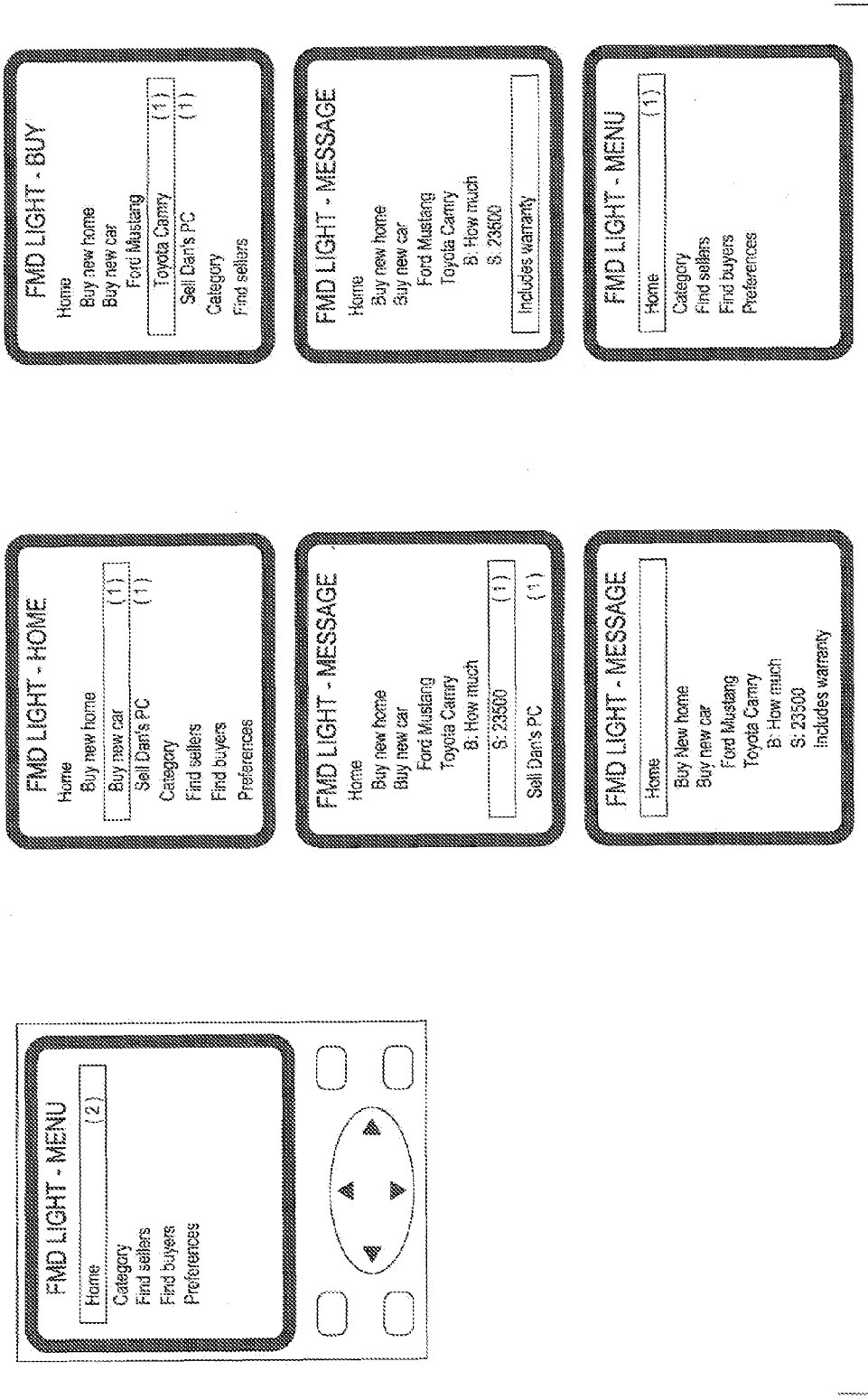
FIGS. 31-32 are examples of screen displays for a cell phone in accordance with one embodiment of the present invention.
Figure 32:
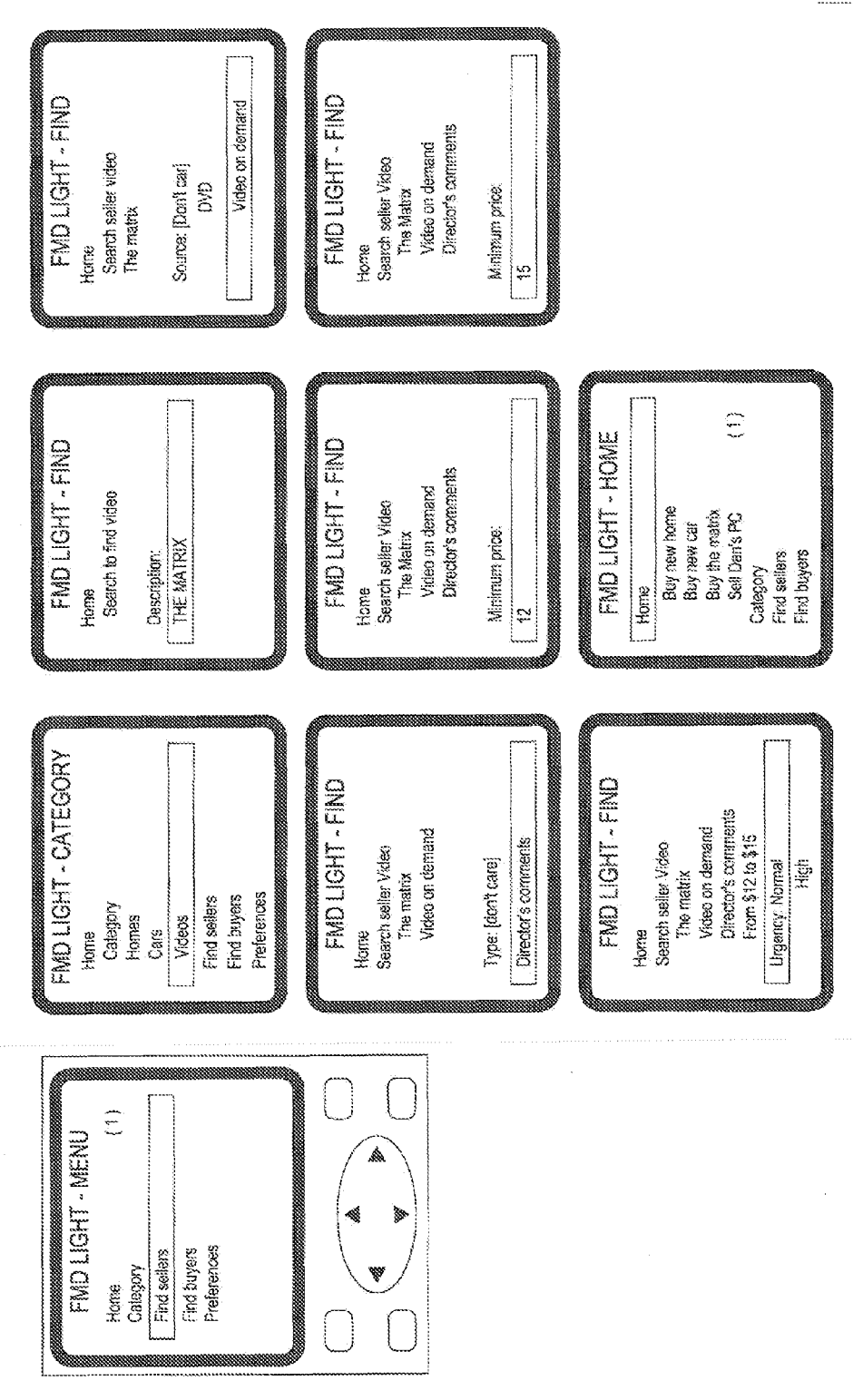
Figure 33:
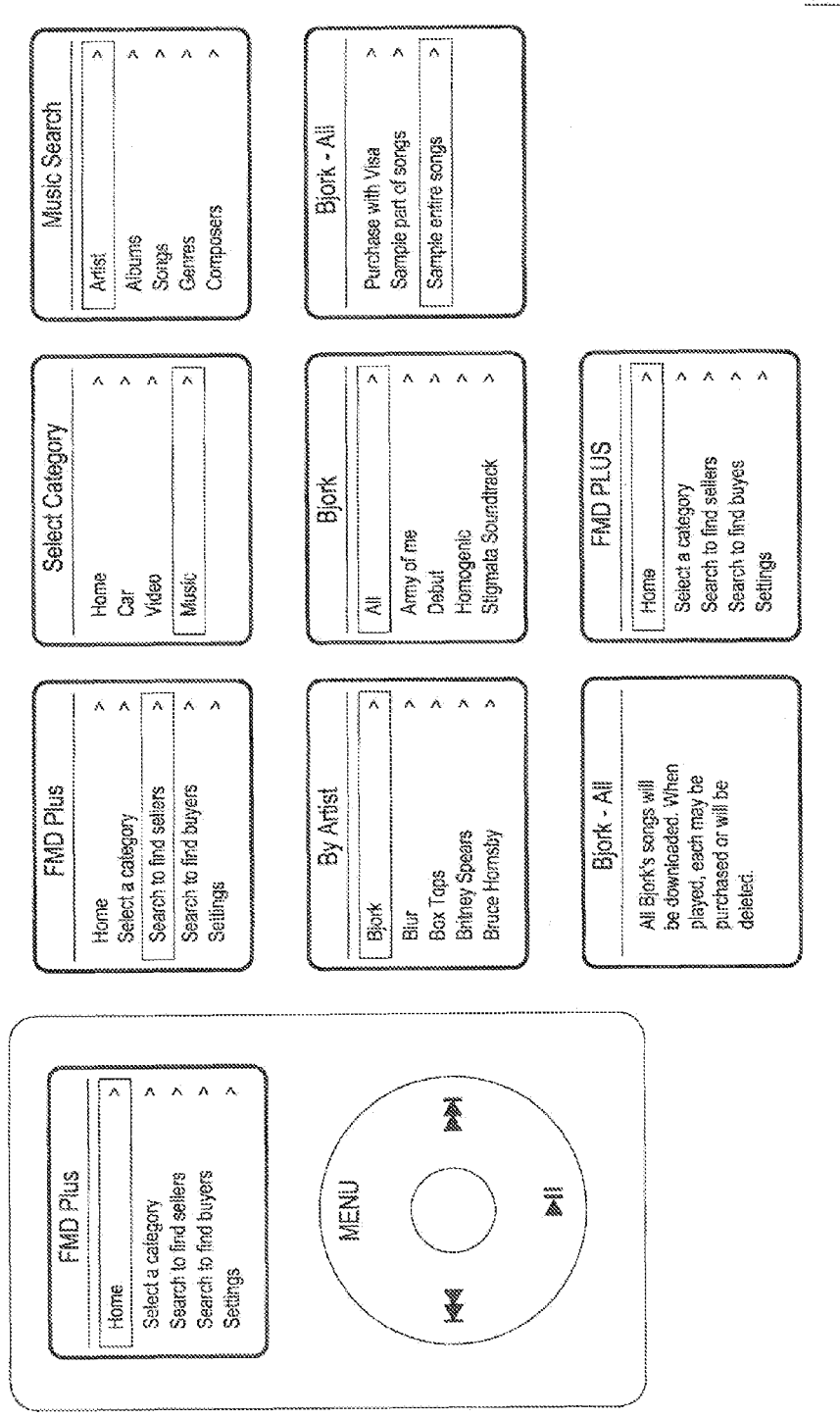
FIG. 33 are examples of screen displays for an iPod in accordance with one embodiment of the present invention.

FIGS. 31-32 are examples of screen displays for a cell phone in accordance with one embodiment of the present invention. FIG. 33 is an example of screen displays for an iPod in accordance with one embodiment of the present invention.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:
1. A method for electronically searching for an item, the method comprising the steps of:
providing an item search index comprising a plurality of item search requests stored in accordance with a set of predefined item categories and a set of predefined item attributes, wherein each item search request comprises at least one of the predefined item categories and at least one of the predefined item attributes, each predefined item category is defined by a taxonomy of attributes comprising the set of predefined item attributes, each predefined item attribute is defined by at least one question and one or more answers to each question, and the requested attributes of the item are selected from the set of predefined item attributes by providing at least one of the answers to at least one of the questions defining the requested attribute of the item;

receiving a search request for the item from a user, wherein the search request comprises a requested category for the item selected from the set of predefined item categories and a requested attribute for the item selected from the set of predefined item attributes;

storing the received search request for the item in the item search index based on the requested category for the item and the requested attribute for the item;

searching the item search index for any previously stored item search requests from other users that match the requested category and the requested attribute;

determining a result of the search;

sending a search response comprising the result of the search;

after completion of searching the item search index, determining the result and sending the search response, automatically monitoring the item search index for a trigger event until the search request is terminated, the trigger event comprising at least one of: storing a new item search request submitted by a different user in the item search index, deleting an existing item search request submitted by the different user from the item search index, and storing a change to the existing item search request submitted by the different user in the item search index;

whenever the trigger event is detected, automatically searching the item search index for any stored item search results that match the requested category and the requested attribute, determining a new result of the search, and comparing the new search result of the search with the result of the search;

whenever the new result differs from the result, automatically sending an updated search response comprising the new result of the search; and whenever the new result is the same as the result, no new search response is sent.

2. The method as recited in claim 1, further comprising the step of creating the item search request by selecting the requested category for the item from the set of predefined item categories and selecting the requested attributes for the item from the set of predefined item attributes for the item by providing the at least one answer to the at least one question defining the requested attribute of the item.

3. The method as recited in claim 2, wherein the requested attributes are selected using one or more drop down boxes, one or more check boxes, one or more radio buttons, one or more thumbnail pictures or videos, voice recognition, a fuzzy logic algorithm, or a neural network or a combination thereof.

4. The method as recited in claim 1, wherein the search request is initiated from a presentation layer, a persistence layer, or a brand layer or a combination thereof.

5. The method as recited in claim 1, wherein the at least one question and the one or more answers to each question that define each attribute taxonomy differ based on a language, a culture or a region associated with the search request.

6. The method as recited in claim 5, wherein the item search index is capable of providing matches regardless of the language, the culture or the region associated with the search request.

7. The method as recited in claim 1, wherein the received search request further comprises a price, a price range, a description, one or more comments, one or more keywords, or a minimum feedback score for the other user associated with any found stored search request or a combination thereof.

8. The method as recited in claim 7, further comprising the step of storing the price, the price range, the description, the comments, the keywords, the minimum feedback score or a combination thereof in the item search index or in a data storage.

9. The method as recited in claim 1, wherein the item comprises a product, a service, a topic, a classified-type advertisement, or a personal-type advertisement or a combination thereof.

10. The method as recited in claim 1, wherein one of:
each stored item search request relates to an item posted for advertisement, exchange, lease, sale, trade or transfer by the user that submitted the stored item search request;
each stored item search request relates to an item sought by the user that submitted the stored item search request for advertisement, exchange, lease, sale, trade or transfer;
each stored item search request comprises information posted about an item provided by the user that submitted the stored item search request; and
each stored item search request comprises information about an item sought by the user that submitted the stored item search request.

11. The method as recited in claim 1, wherein one of:
the received search request relates to an item posted for advertisement, exchange, lease, sale, trade or transfer by the user that submitted the received search request;
the received search request relates to an item sought by the user that submitted the received search request for advertisement, exchange, lease, sale, trade or transfer;
the received search request comprises information posted about an item provided by the user that submitted the received search request;
the received search request comprises information about an item sought by the user that submitted the received search request;
the received search request comprises a search for posted items that satisfy one or more criteria;
the received search request comprises a search for sought items that satisfy one or more criteria;
the received search request comprises a search for sought information;
the received search request comprises a bulk search;
the received search request comprises a search for close hits that satisfy one or more criteria; and
the received search request comprises a search for lost sales that satisfy one or more criteria.

12. The method as recited in claim 1, wherein the received search request comprises a search for sought attributes.

13. The method as recited in claim 1, wherein the search request is submitted by one of: a buyer, a seller, a buyer/seller, a "window shopper", a researcher, and an interested user or a combination thereof.

14. The method as recited in claim 1, wherein the predefined item categories are grouped into one or more subject areas.

15. The method as recited in claim 14, wherein:
the subject areas comprise one of real estate, motor vehicles, employment, financial services, residential services, professional services, travel, vacation, computers, entertainment, dining, dating, hobbies, electronics, furniture, tools, home improvement, office supplies, household items, sporting goods, sporting events, recreation, or event tickets;

the predefined item categories within the real estate subject area comprise houses, apartments, land, farms, commercial, insurance, finance or moving/storage;

the predefined item categories within the motor vehicles subject area comprise cars, trucks, recreational, repairs, insurance or finance;

the predefined item categories within employment comprise administrative, professional, education, healthcare, retail or manufacturing;

the predefined item categories within financial services comprise mortgages, loans, brokerage accounts, mutual funds, small business or bill pay;

the predefined item categories within residential services comprise plumber, electrician, lawn & garden, appliance repair, remodeling or cleaning; and the predefined item categories within professional service comprise attorneys, accountants or computer services.

16. The method as recited in claim 1, wherein the trigger event further comprises one of: a change in the user's stored item search request, a specified time period, receipt of an update request from the user, and any other change to the item search index that would change the result of the search.

17. The method as recited in claim 1, wherein the search request is terminated after one of: steps are repeated until a specified time period has elapsed, a specified number of searches are performed, the search request is changed, deleted or terminated by the user, the search request is changed, deleted or terminated by a system, and the search request is replaced or a combination thereof.

18. The method as recited in claim 1, wherein the search response is sent to a user specified device comprising one of: a computer, a laptop, a handheld computer, an e-mail address, a personal data assistant, a telephone, a mobile telephone, a portable media player, a portable communications device, a facsimile device, and a Web-enabled device or a combination thereof.

19. The method as recited in claim 1, wherein the stored item search request does not contain any personal information relating to the user that submitted the stored search request or only contains personal information added by the user that submitted the stored search request.

20. The method as recited in claim 1, further comprising the step of removing any personal information from the received search request relating to the user that submitted the received search request or providing a warning to the user that submitted the received search request before the received search request is stored in the item search index.

21. The method as recited in claim 1, wherein the stored item search requests match the requested category and the requested attribute(s) whenever:

the attributes of the stored item search requests are equal to or exceed the requested attributes;

the attributes of the stored item search requests are substantially similar to the requested attributes;

the attributes of the stored item search requests are within a range of the requested attributes; or a relevancy score for the stored item search requests is satisfied.

22. The method as recited in claim 1, wherein the step of searching the item search index is halted after a specified number of matches have been found.

23. The method as recited in claim 1, further comprising the step of updating the item search index whenever a stored item search request is added, changed or deleted.

24. The method as recited in claim 1, further comprising the step of determining a relevancy score for each found stored item search request.

25. The method as recited in claim 24, further comprising the step of displaying the relevancy score graphically.

26. The method as recited in claim 24, wherein the determination of the relevancy score is based on one of: one or more user preferences, a distance between an item associated with a stored item search request and a location of the user, and a user specified budget or a combination thereof.

27. The method as recited in claim 24, further comprising the step of providing the relevancy score to the user associated with the stored item search request, or another interested user or a combination thereof.

28. The method as recited in claim 24, wherein the determination of the relevancy score is based on one of: one or more user preferences, a closeness of the requested attributes in the search request to the attributes of the stored item search request, a distance between an item associated with a stored item search request and a location of the user, and a user specified budget or a combination thereof.

29. The method as recited in claim 24, wherein the step of determining the relevancy score for each found stored result comprises the step of calculating a sum of the relevancy scores for each requested attribute in the search request and dividing the sum by the number of requested attributes in the search request, wherein the relevancy score for each requested attribute comprises a first value whenever the requested attribute is not specified in the stored search request, a second value whenever the requested attribute matches the attribute of the stored search request and the requested attribute is Must Have, a third value whenever the requested attribute that matches the attribute of the stored search request and the requested attribute is not Must Have, a fourth value whenever the requested attribute that does not match the attribute of the stored search request and the requested attribute is Must Have, and a fifth value whenever the requested attribute does not match the attribute of the stored search request and the requested attribute is not Must Have.

30. The method as recited in claim 1, further comprising the step of receiving one or more preferences associated with the user or the search request.

31. The method as recited in claim 30, wherein the one or more preferences comprise one of: an urgency, a results per screen, an minimum required relevancy limit, a minimum required rating associated with the stored search request, one or more user devices that are to be used for communications, and one or more messaging limits or a combination thereof.

32. The method as recited in claim 1, further comprising the step of sending a notification to the user whenever:

a received search request is changed that previously matched the stored item search request associated with the user;

a received search request is changed that now matches the stored item search request associated with the user;

an item associated with a stored item search request is located within a specified distance from a location of the user;

the result of the search request by the user has changed;

the result of the search request by the user has not changed; or a relevancy score for the stored item search requests is satisfied.

33. The method as recited in claim 32, wherein the notification comprises one of: a request to return to the stored item search request or the result of the search, a link to return to the stored item search request or the result of the search, a description of a reason for the notification, a message, and a new search request or a combination thereof.

34. The method as recited in claim 1, further comprising the step of sending a notification to the user whenever the requested category of a received search request matches a stored item search request associated with the user.

35. The method as recited in claim 1, further comprising the step of providing a messaging system between the user that submitted the search request and each user associated with the stored item search requests that matched the requested category.

36. The method as recited in claim 35, wherein the messages within the messaging system are private between the user that submitted the search request and each user associated with the stored item search requests that matched the requested category and cannot be accessed by third parties.

37. The method as recited in claim 35, wherein the messages within the messaging system do not contain any personal information about the user that submitted the search request and each user associated with the stored item search requests that matched the requested category unless such personal information is added by one of the users.

38. The method as recited in claim 35, wherein the messages within the messaging system are not tied to a mail server or an e-mail address.

39. The method as recited in claim 35, wherein the messages are logged and tied to the search request.

40. The method as recited in claim 35, wherein the user that submitted the search request and each user associated with the stored item search requests that matched the requested category can specify a limit on the number of messages that another user can send to them.

41. The method as recited in claim 35, wherein the user can add an attachment or additional content to the messages within the messaging system if the attachment satisfies one or more criteria.

42. The method as recited in claim 35, wherein the user can accept unsolicited offers, unsolicited messages, questionnaires, advertisements or a combination thereof if such offers, messages, questionnaires or advertisements satisfy one or more criteria.

43. The method as recited in claim 1, further comprising the steps of:
receiving feedback or comments regarding the user or a stored search request or a combination thereof; and
associating the feedback or comments with the user or the stored item search request or a combination thereof.

44. The method as recited in claim 1, further comprising the step of authenticating the received search request.

45. The method as recited in claim 1, wherein the steps of storing the search request, searching the item search index, determining the result of the search and sending the search response are performed at a level of functionality associated with the user associated with the received search request.

46. The method as recited in claim 1, further comprising the step of resubmitting a previously submitted search request.

47. The method as recited in claim 1, further comprising the step of linking information contained in a legacy database to the item search index.

48. The method as recited in claim 47, wherein the information is linked via an XML or EDI index, loaded into the item search index, or loaded and indexed into a data storage or a combination thereof.

49. The method as recited in claim 1, further comprising the step of deleting a stored item search request.

50. A non-transitory computer readable medium for electronically searching for an item comprising program instructions when executed by a processor causes the processor to perform the steps of:
accessing an item search index comprising a plurality of item search requests stored in accordance with a set of predefined item categories and a set of predefined item attributes, wherein each item search request comprises at least one of the predefined item categories and at least one of the predefined item attributes, each predefined item category is defined by a taxonomy of attributes comprising the set of predefined item attributes, each predefined item attribute is defined by at least one question and one or more answers to each question, and the requested attributes of the item are selected from the set of predefined item attributes by providing at least one of the answers to at least one of the questions defining the requested attribute of the item;
receiving a search request for the item from a user, wherein the search request comprises a requested category for the item selected from the set of predefined item categories and a requested attribute for the item selected from the set of predefined item attributes;
storing the received search request for the item in the item search index based on the requested category for the item and the requested attribute for the item;
searching the item search index for any previously stored item search requests from other users that match the requested category and the requested attribute;
determining a result of the search;
sending a search response comprising the result of the search;
after completion of searching the item search index, determining the result and sending the search response, automatically monitoring the item search index for a trigger event until the search request is terminated, wherein the trigger event comprises at least one of: storing a new search request submitted by a different user in the item search index, deleting an existing search request submitted by the different user from the item search index, and storing a change to the existing item search request submitted by the different user in the item search index;
whenever the trigger event is detected, automatically searching the item search index for any stored item search results that match the requested category and the requested attribute, determining a new result of the search, and comparing the new search result of the search with the result of the search;
whenever the new result differs from the result, automatically sending an updated search response comprising the new result of the search; and
whenever the new result is the same as the result, no new search response is sent.

51. An apparatus for electronically searching for an item comprising:
a computer having a processor communicably coupled to a data storage;
an item search index stored in the data storage comprising a plurality of item search requests stored in accordance with a set of predefined item categories and a set of predefined item attributes, wherein each item search request comprises at least one of the predefined item categories and at least one of the predefined item attributes, each predefined item category is defined by a taxonomy of attributes comprising the set of predefined item attributes, each predefined item attribute is defined by at least one question and one or more answers to each question, and the requested attributes of the item are selected from the set of predefined item attributes by providing at least one of the answers to at least one of the questions defining the requested attribute of the item;

a search engine executable by the processor that causes the processor to:
  (a) receive a search request for the item from a user, wherein the search request comprises a requested category for the item selected from the set of predefined item categories and a requested attribute for the item selected from the set of predefined item attributes;
  (b) store the received search request for the item in the item search index based on the requested category for the item and the requested attribute for the item;
  (c) search the item search index for any previously stored item search requests from other users that match the requested category and the requested attribute;
  (d) determine a result of the search;
  (e) send a search response comprising the result of the search;
  (f) after the processor completes searching the item search index, determining the result and sending the search response, automatically monitoring the item search index for a trigger event until the search request is terminated, wherein the trigger event comprises at least one of: storing a new search request submitted by a different user in the item search index, deleting an existing search request submitted by the different user from the item search index, and storing a change to the existing item search request submitted by the different user in the item search index;
  (g) whenever the trigger event is detected, automatically search the item search index for any stored item search results that match the requested category and the requested attribute, determine a new result of the search, and compare the new search result of the search with the result of the search;
  (h) whenever the new result differs from the result, automatically send an updated search response comprising the new result of the search; and
  (i) whenever the new result is the same as the result, no new search response is sent.

52. The apparatus as recited in claim 51, further comprising a user interface for entering the search request and receiving the result of the search response.

53. The apparatus as recited in claim 51, further comprising a brand layer communicably coupled to the search engine.

54. The apparatus as recited in claim 51, wherein the item search index is bi-directional such that the item search index allows a buyer to find a seller, the buyer to find another buyer, the seller to find the buyer, and the seller to find another seller.

55. The apparatus as recited in claim 51, further comprising a private messaging system communicably coupled to the search engine that allows buyers and sellers to communicate directly.

56. A system for electronically searching for an item comprising:
  a network;
  an item search index communicably coupled to the network comprising a plurality of item search requests stored in accordance with a set of predefined item categories and a set of predefined item attributes, wherein each item search request comprises at least one of the predefined item categories and at least one of the predefined item attributes, each predefined item category is defined by a taxonomy of attributes comprising the set of predefined item attributes, each predefined item attribute is defined by at least one question and one or more answers to each question, and the requested attributes of the item are selected from the set of predefined item attributes by providing at least one of the answers to at least one of the questions defining the requested attribute of the item;
  one or more user devices communicably coupled to the network;
  a user interface communicably coupled to the network for entering a search request from a user and receiving a search response, wherein the search request comprises a requested category for the item selected from the set of predefined item categories;
  a search engine communicably coupled to the user interface and the item search index via the network wherein the search engine:
    (a) receives the search request for the item wherein the requested category for the item is selected from the set of predefined item categories and a requested attribute for the item selected from the set of predefined item attributes;
    (b) stores the received search request for the item in the item search index based on the requested category for the item and the requested attribute for the item;
    (c) searches the item search index for any previously stored item search requests from other users that match the requested category and the requested attribute;
    (d) determines the result of the search;
    (e) sends the result of the search;
    (f) after the search engine completes searching the item search index, determining the result and sending the search response, automatically monitoring the item search index for a trigger event until the search request is terminated, wherein the trigger event comprises at least one of: storing a new search request submitted by a different user in the item search index, deleting an existing search request submitted by the different user from the item search index, and storing a change to the existing item search request submitted by the different user in the item search index;
    (g) whenever the trigger event is detected, automatically searches the item search index for any stored item search results that match the requested category and the requested attribute, determines a new result of the search, and compares the new search result of the search with the result of the search;
    (h) whenever the new result differs from the result, automatically sends an updated search response comprising the new result of the search; and
    (i) whenever the new result is the same as the result, no new search response is sent.

57. The system as recited in claim 56, wherein the user interface is resident on the one or more user devices.

58. The system as recited in claim 56, further comprising a data storage communicably coupled to the search engine.

59. The system as recited in claim 56, further comprising a brand layer communicably coupled to the search engine.

60. The system as recited in claim 56, wherein the item search index is bi directional between a buyer and a seller, the buyer and another buyer, the seller and the buyer, or the seller and another seller.

61. The system as recited in claim 56, further comprising a private messaging system communicably coupled to the search engine.

* * * * *